US008473952B2

(12) United States Patent
Marathe et al.

(10) Patent No.: US 8,473,952 B2
(45) Date of Patent: Jun. 25, 2013

(54) SYSTEM AND METHOD FOR COMMUNICATION BETWEEN CONCURRENT TRANSACTIONS USING TRANSACTION COMMUNICATOR OBJECTS

(75) Inventors: Virendra J. Marathe, Florence, MA (US); Victor M. Luchangco, Cambridge, MA (US)

(73) Assignee: Oracle International Corporation, Redwood City, CA (US)

( * ) Notice: Subject to any disclaimer, the term of this patent is extended or adjusted under 35 U.S.C. 154(b) by 387 days.

(21) Appl. No.: 12/828,105

(22) Filed: Jun. 30, 2010

(65) Prior Publication Data

US 2012/0005530 A1    Jan. 5, 2012

(51) Int. Cl.
 *G06F 9/46* (2006.01)
(52) U.S. Cl.
 USPC ........................................................ 718/101
(58) Field of Classification Search
 None
 See application file for complete search history.

(56) References Cited

U.S. PATENT DOCUMENTS

| | | | |
|---|---|---|---|
| 7,720,891 B2 | 5/2010 | Luchangco et al. | |
| 7,984,248 B2 * | 7/2011 | Kottapalli et al. | ............ 711/152 |
| 2007/0083569 A1 | 4/2007 | Wong et al. | |
| 2010/0162249 A1 | 6/2010 | Shpeisman et al. | |

OTHER PUBLICATIONS

C. Blundell, E. C. Lewis, and M. Martin. Deconstructing Transactions: The Subtleties of Atomicity. In the 4th Annual Workshop on Duplicating, Deconstructing, and Debunking, 2005, 7 pages.
L.Dalessandro, V. J. Marathe, M. F. Spear, and M. L. Scott. Capabilities and Limitations of Library-Based Software Transactional Memory in C++. In 2nd ACM SIGPLAN Workshop on Languages, Compilers and Hardware Support for Transactional Computing, 2007, 9 pages.
P. Dudnik and M. M. Swift. Condition Variables and Transactional Memory: Problem or Opportunity? In Proceedings of the 4th ACM SIGPLAN Workshop on Transactional Computing, 2009, 10 pages.
T.Harris and K. Fraser. Language Support for Lightweight Transactions. In Proceedings of the 18th Annual ACM SIGPLAN Conference on Object-Oriented Programing, Systems, Languages, and Applications, pp. 388-402, 2003.
V. Luchangco and V. J. Marathe. Transaction Synchronizers. In Proceedings of the Workshop on Synchronization and Concurrency in Object-Oriented Languages, 2005, 6 pages.
H. E. Ramadan, I. Roy, M. Herlihy, and E. Witchel. Committing Conflicting Transactions in an STM. In Proceedings of the 14th ACM SIGPLAN Symposium on Principles and Practice of Parallel Programming, pp. 163-172, 2009.
H. E. Ramadan, I. Roy, and E. Witchel. Dependence-Aware Transactional Memory for Increased Concurrency. In Proceedings of the 41st Annual IEEE/ACM International Symposium on Microarchitecture, pp. 246-257, 2008.
Y. Smaragdakis, A. Kay, R. Behrends, and M. Young. Transactions with Isolation and Cooperation. In Proceedings of the 22nd Annual ACM SIGPLAN Conference on Object Oriented Programming Systems and Applications, pp. 191-210, 2007.
Memory Models for Open-Nested Transactions. Kunal Agrawal, Charles Leiserson, and Jim Sukha. MSPC 2006, 13 pages.

* cited by examiner

*Primary Examiner* — Emerson Puente
*Assistant Examiner* — Gregory A Kessler
(74) *Attorney, Agent, or Firm* — Robert C. Kowert; Meyertons, Hood, Kivlin, Kowert & Goetzel, P.C.

(57) ABSTRACT

Transactional memory implementations may be extended to include special transaction communicator objects through which concurrent transactions can communicate. Changes by a first transaction to a communicator may be visible to concurrent transactions before the first transaction commits. Although isolation of transactions may be compromised by such communication, the effects of this compromise may be limited by tracking dependencies among transactions, and preventing any transaction from committing unless every transaction whose changes it has observed also commits. For example, mutually dependent or cyclically dependent transactions may commit or abort together. Transactions that do not communicate with each other may remain isolated. The system may provide a communicator-isolating transaction that ensures isolation even for accesses to communicators, which may be implemented using nesting transactions. True (e.g., read-after-write) dependencies, ordering (e.g., write-after-write) dependencies, and/or anti-dependencies (e.g., write-after-read dependencies) may be tracked, and a resulting dependency graph may be perused by the commit protocol.

20 Claims, 16 Drawing Sheets

SYSTEM AND METHOD FOR COMMUNICATION BETWEEN CONCURRENT TRANSACTIONS USING TRANSACTION COMMUNICATOR OBJECTS

BACKGROUND OF THE INVENTION

1. Field of the Invention

This invention relates generally to computer systems that implement transactional memory, and more specifically to a system and methods for communication between transactions using transaction communicator objects for which transaction isolation properties are relaxed.

2. Description of the Related Art

Transactional memory is a promising technology to ease programming of multiprocessor systems. With transactional memory, a thread can execute a block of code as a transaction, which may either commit (in which case its effects become visible to other threads) or abort (in which case its effects are discarded). A transactional memory system manages the transactions, ensuring that transactions that commit are isolated (i.e. that each transaction appears as though it were executed without any operations of other transactions being interleaved with its own) and that the transactions appear to be executed in a consistent order (i.e. the transaction order). Thus, a transaction sees the effects of those transactions that precede it in the transaction order, and no transaction sees partial effects of any other transaction.

The isolation property of transactions can greatly simplify concurrent programming. For example, a programmer can consider each transaction separately, rather than having to consider all possible interleavings of its operations with the operations of other transactions. However, isolation can also limit the applicability of transactions. For example, isolated transactions are incompatible with some common synchronization mechanisms, such as barriers and condition variables. More generally, isolation disallows programming idioms that require communication among transactions while they are active (i.e. not yet committed or aborted).

Some previous systems employ "synchronizers", which relax isolation to allow concurrent transactions to cooperate. Synchronizers maintain "collaborator sets" that are guaranteed to commit or abort together, providing the equivalent of a bidirectional dependency between any two transactions in a collaborator set. This bidirectional dependency introduces difficulties in the use and implementation of synchronizers, because transactions in a collaborator set that is about to commit could be forced to abort by another transaction belatedly joining the collaborator set. Tracking dependencies among transactions has been proposed as a way to reduce aborts in software transactional memory. However, prior approaches to tracking dependencies maintain the isolation properties of the transactions. Therefore, transactions with cyclic dependencies must all abort if one aborts.

SUMMARY

The system and methods described herein may extend transactional memory implementations to support "transaction communicators", which are special objects through which concurrent transactions can communicate. Transactional accesses to transaction communicators may not be isolated, allowing concurrent transactions to communicate with each other by observing and manipulating the state of these transaction communicators. In some embodiments, changes made to transaction communicator objects by a first transaction may be visible to concurrent transactions before the first transaction commits. Although isolation of transactions may be compromised by such communication, the effects of this compromise may be limited by tracking dependencies among transactions, and preventing any transaction from committing unless every transaction whose changes it has observed also commits. For example, in some embodiments, mutually dependent transactions may be required to commit or abort together, while transactions that do not communicate in this manner may remain isolated from each other.

To help programmers synchronize accesses to such communicators, some embodiments may provide a special type of transaction that ensures isolation even for accesses to communicators. This communicator-isolating transaction may be implemented as a new kind of nested transaction that guarantees isolation even for accesses made to transaction communicators by transactions. Using communicator-isolating nested transactions, a programmer may better control the interleavings of communicator accesses by transactions. The use of transaction communicators in conjunction with communicator-isolating transactions may broaden the application space of transactional memory implementations as compared to existing transactional memory systems. For example, in some embodiments, programmers may more readily use idioms such as CSP-style synchronous communication, barrier synchronization, condition synchronization, etc. in memory transactions executed in these systems. In some embodiments, class definitions for transaction communicator objects may be included in a transaction support library.

In some embodiments, a first transaction that accesses a transaction communicator object may declare the object as a communicator object, while in other embodiments, a communicator object may be declared outside of any particular transaction. The first transaction may access the communicator object, which may include a data object portion. For example, the first transaction may access the data object portion of the communicator object to read its value or to write a new value to the data object. In some embodiments, as part of accessing the communicator object, the first transaction may update a dependency tracking data structure (e.g., a dependency list) associated with the first transaction. For example, in some embodiments, the first transaction may add a reader list associated with the communicator object and/or an identifier of the last transaction that wrote to the communicator object to its associated dependency list as part of the access operation.

As described in more detail herein, prior to the first transaction reaching a terminal state (e.g., prior to the first transaction aborting or committing, or prior to the first transaction attempting to commit), a second transaction may access the communicator object and may update a dependency list associated with the second transaction. For example, in some embodiments, the second transaction may add a reader list associated with the communicator object and/or an identifier of the last transaction that wrote to the communicator object to its associated dependency list as part of the access operation.

In some embodiments, the first transaction accessing the communicator object may write a value to the data object, and the second transaction accessing the communicator object may read the value of the data object that was written by the first transaction even though the first transaction has not yet committed its results. In this way, the communicator object may be used to communicate between the first and second transactions. In some embodiments, access operations directed to the communicator object by the first transaction and/or the second transaction may obtain exclusive ownership of the communicator object prior to accessing the data object portion of the communicator object.

In some embodiments, when the second transaction attempts to commit its results, the results of that attempt may be dependent, at least in part, on the dependency list associated with the second transaction. In some embodiments and in some situations, the success of the attempt to commit the second transaction may be further dependent on the dependency list associated with the first transaction. The attempt to commit the second transaction may include determining whether the first transaction has aborted or committed, and the results of the attempt may be dependent on whether the first transaction has aborted or committed. In response to the attempt to commit the second transaction failing, the second transaction may roll back values of any non-communicator objects that were modified by the second transaction, as well as values of any communicator objects that were modified by the second transaction.

In some embodiments, the second transaction may be nested within the first transaction, and at least one of the first transaction and the second transaction may be a communicator-isolating transaction that ensures isolation of communicators accesses by the communicator-isolating transaction.

In some embodiments, transaction communicator objects may be used for communication between multiple concurrent transactions, and accesses to these transaction communicator objects may imply a sequence order for transactions that are dependent on each other. In other words, there may be an implied order of the dependencies between the concurrent transactions based on the order in which they access one or more communicator objects. In some embodiments, a cycle of dependencies may be established between the transactions in the sequence of transactions such that each successive transaction is dependent on one or more previous transactions in the sequence order, and the first transaction in the sequence is dependent on a later transaction in the sequence order (e.g., it may be dependent on the last transaction in the sequence, or any other transaction that follows it in the sequence order). In some embodiments, a mutual dependency relationship may be established between two transactions, e.g., when such a sequence of transactions includes only two transactions, and they both access one or more of the same transaction communicators. In other embodiments, a cycle of dependencies may be established when each successive transaction in such a sequence of transactions accesses a transaction communicator that was accessed by a previous transaction in the sequence order, and the first transaction in the sequence of transactions accesses a transaction communicator that was accessed by a later transaction in the sequence order. These mutual and/or cyclic dependencies may be recorded in one or more dependency tracking data structures in which indications of dependencies are recorded and tracked. For example, in some embodiments, all of the transactions in a sequence of transactions may update the same dependency tracking data structure, while in other embodiments, a dependency tracking data structure may be associated with each transaction, and that transaction may update its dependency tracking data structure to record indications of the other transactions on which it depends.

Figure 1A:
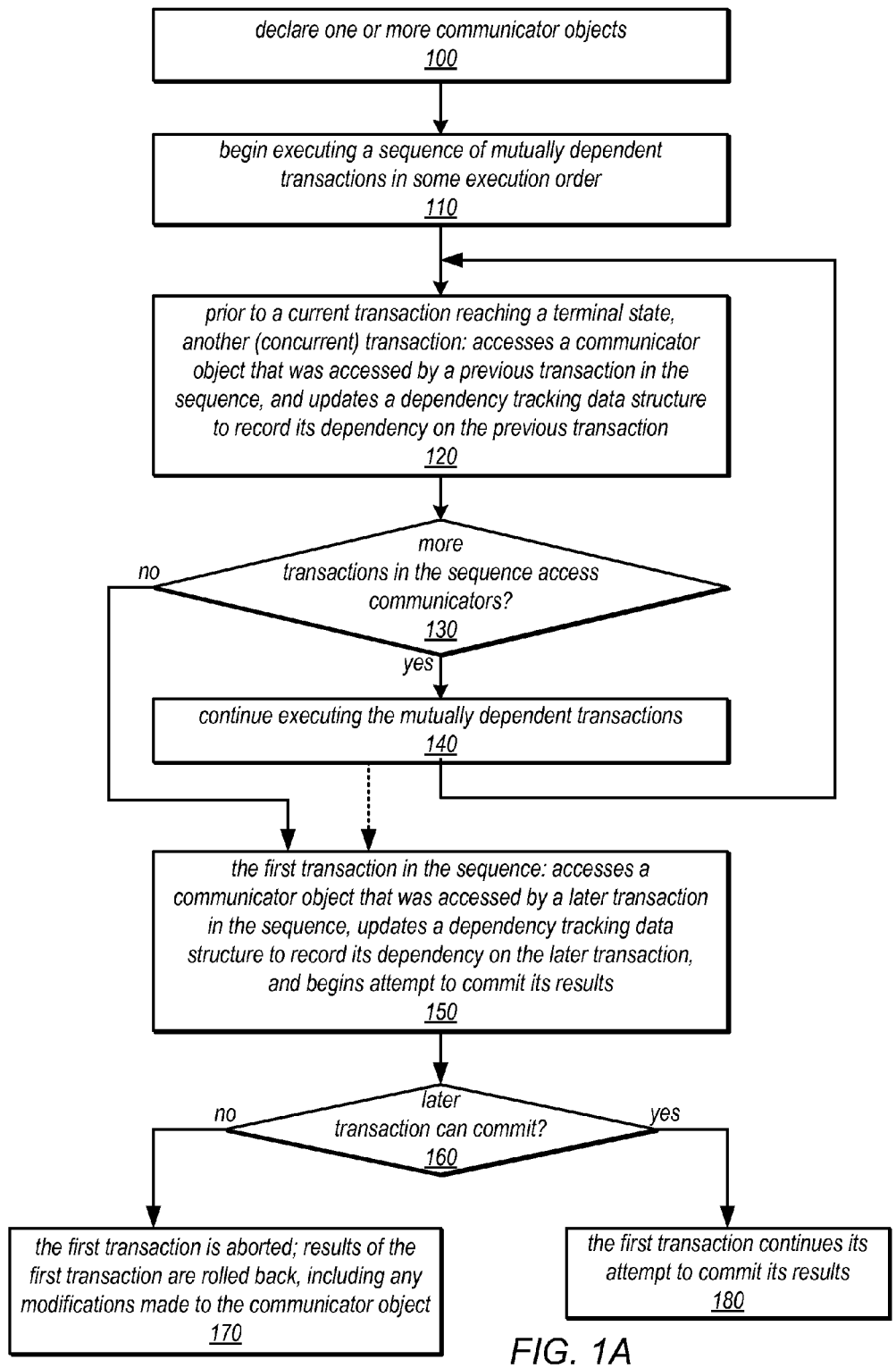
FIGS. 1A-1C are flow diagrams illustrating various embodiments of a method for employing special communicator objects to enable communication between concurrent transactions.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION OF THE EMBODIMENTS

Transactional memory (TM) runtimes may ensure atomic and isolated execution of atomic blocks of code, i.e. those that are marked as transactions. The assumption of these properties (isolation, in particular) may significantly simplify concurrent programming because the TM runtime may ensure that there exists some overall order of execution of transactions. As a result, the programmer may not have to be concerned with (or take into account) any interleavings between individual memory access operations within concurrent transactions. However, isolation may restrict the programming idioms permitted within transactions. Specifically, isolation may prohibit the use of programmer intended interactions among concurrent transactions. As a result, the use of several common programming idioms such as Communicating Sequential Processes (CSP) style synchronous communication, barrier synchronization, condition synchronization, etc. may be partially or completely precluded within transactions. This may significantly limit the range of applications for which TM can be effectively used. The system and methods described herein may address these issues by providing a class of mechanisms that permit communication between transactions in a controlled manner.

For example, a system may processes client jobs that should appear to be handled atomically. Processing some of these client jobs may involve accessing a database, and these accesses should themselves appear to be performed atomically. The system may be organized such that the threads handling client jobs are distinct from those with direct access to the database. In this example, a thread handling a client job that requires access to the database may place a request to do so into a queue, and a database thread may handle the request. In such a system, a thread handling the client job cannot execute the client job within a single transaction. Instead, the thread handling the client job must communicate with the database thread that handles its request. In this example, the thread handling the client job cannot simply break the client job into two transactions (such as one to handle the part before the database request and another to handle the part after receiving the result of the database request), because if the transaction for the second part aborts, the effects of the first transaction (and of the database thread that satisfied the request) should be rolled back as well, but the first transaction (and/or the transaction that handles the database request) may have already committed its results.

The systems and method described herein may enable communication between concurrent transactions by selectively relaxing isolation of transactional accesses to a small set of shared objects. For example, the system and methods described herein may extend transactional memory to support "transaction communicators", which are special objects through which concurrent transactions can communicate. In some embodiments, changes made to such transaction communicator objects by a first transaction may be visible to concurrent transactions before the first transaction commits (e.g., before knowing whether the transaction will abort or commit). Although isolation of transactions may be compromised by such communication, the effects of this compromise may be limited by the runtime system by enforcing data dependencies between communicating transactions. More specifically, the runtime system may track dependencies among transactions, and may prevent any transaction from committing unless every transaction whose changes it has observed also commits. For example, in some embodiments, mutually dependent transactions (i.e. those that access the same transaction communicator) may be required to commit or abort together. If they commit, they may all occupy the same position in the transaction order. Transactions that do not communicate in this manner (i.e. transactions that do not access any transaction communicators, or at least no transaction communicators in common) may remain isolated from each other. In some embodiments, two transactions may be isolated from each other unless they access a common communicator, or are in a chain of transactions in which each adjacent pair in the chain accesses a common communicator.

In some embodiments, communicators may be explicitly declared, and there may be relatively few of them compared to the total number of shared objects in a parallel program. In some use models, programmers may think of accesses to transaction communicator objects as if they were synchronization operations of a special type, rather than ordinary memory accesses, and may therefore use them judiciously. In some embodiments, class definitions for transaction communicator objects may be included in a transaction support library.

Communication among active transactions violates the isolation property typically associated with transactions, and can result in the types of data races that transactional memory and other synchronization mechanisms are designed to prevent. The systems and methods described herein may reduce or avoid these issues by tracking data flow dependencies (e.g., read-after-write dependencies) and, in some embodiments, ordering based dependencies (e.g., write-after-write and/or write-after-read dependencies) between transactions, and by preventing any transaction from committing unless every transaction on which it depends also commits.

The use of transaction communicators may in some cases reintroduce a problem that transactions are intended to eliminate, i.e. the possibility of unsynchronized conflicting accesses to shared state. Although this problem may be greatly reduced within transactions because such conflicts can occur only with accesses to transaction communicator objects (which should be relatively rare and must be explicitly declared), programmers may need to resort to other means of synchronization to control access to transaction communicators. In some embodiments, to help programmers maintain a transactional style of programming, the system may provide a special kind of transaction that ensures isolation even for accesses to communicators. This "communicator-isolating transaction" may be useful to the programmer in effectively dealing with data races between concurrent communicator accesses by transactions. In some embodiments, these special communicator-isolating transactions may support monitor-style wait and notify operations.

The utility of transaction communicator objects is illustrated herein by way of several examples, including examples in which they are used to implement exchangers and producer-consumer queues that can be used for inter-transaction communication.

One embodiment of a method for employing special communicator objects to enable communication between concurrent transactions is illustrated in FIG. 1A. As illustrated in this example, the method may include explicitly declaring one or more communicator objects, as in 100. For example, in some embodiments, a communicator may be declared as an instance of a transaction communicator class. As described in more detail below, objects of this class may include a data field, or data object portion, that can be modified by and visible to concurrent transactions using methods defined for the class. As illustrated at 110 in this example, the method may include beginning execution of a sequence of mutually dependent transactions. As described herein, these transactions may be executed in some order that results in a sequence of dependencies between the transactions. In other words, regardless of the order in which the transactions begin and/or end, the order in which they access one or more communicator objects may imply a sequence of dependencies between the transactions. As illustrated at 120 in FIG. 1A, the method may include, prior to a current one of the transactions in the sequence reaching a terminal state (e.g., prior to the transaction aborting, committing its results, or reaching another state indicating that it will abort or commit), another (concurrently executing) transaction in the sequence accessing a communicator object that was accessed by a previous transaction in the sequence (e.g., to read and/or write to its data field). The other transaction may update a dependency tracking data structure (e.g., a dependency list or other tracking structure) to record the fact that the other transaction is dependent on the previous transaction. As described herein, this may in some embodiments create a dependency relationship between the two transactions.

If there are more transactions in the sequence of dependencies that access transaction communicators, shown as the positive exit from 130, the method may include continuing execution of the mutually dependent transaction (as in 140), including repeating the operations illustrated at 120-130 for each of the accesses to communicators made by transactions in the sequence. As illustrated in this example, each of these accesses may create additional dependencies between pairs of transactions in the sequence. As illustrated at FIG. 1C, at some point (e.g., after all dependencies between the transactions in the sequence have been recorded, shown as the negative exit from 130, or at any other point while the sequence of transactions is executing, shown as the dashed line between 140 and 150), the method may include the first transaction in the sequence accessing an object that was accessed by a later transaction in the sequence (e.g., the last transaction in the sequence, or any other transaction that falls later in the sequence of transaction dependencies), and updating a dependency tracking data structure to record its dependency on that later transaction. This may in various embodiments create a mutual dependency relationship between two transactions (in the case that there are only two transactions in the sequence of transactions) or a cycle of dependency relationships, if there are three or more transactions in the sequence of transactions.

Once the first transaction has completed execution (i.e. once all of the instructions within the atomic scope of the first transaction have been executed), the first transaction may begin an attempt to commit its results, as in 150. As illustrated in this example, the attempt may include determining whether the later transaction in the sequence of transactions (i.e. the one on which the first transaction depends) can commit, as in 160.

As described herein, mutually dependent transactions must either both commit or both abort. In the example illustrated in FIG. 1A, this dependency is established when the transactions in the sequence of transactions update a dependency tracking data structure to record their dependencies. Therefore, if the later transaction in the sequence of transactions (i.e. the one on which the first transaction depends) cannot commit, shown as the negative exit from 160, the method may include the first transaction aborting, as in 170. In this case, the method may include the results of the first transaction being rolled back, including any modifications made to the communicator object. If the later transaction can commit, shown as the positive exit from 160, the method may include the first transaction continuing its attempt to commit its results, as in 180.

Figure 1B:
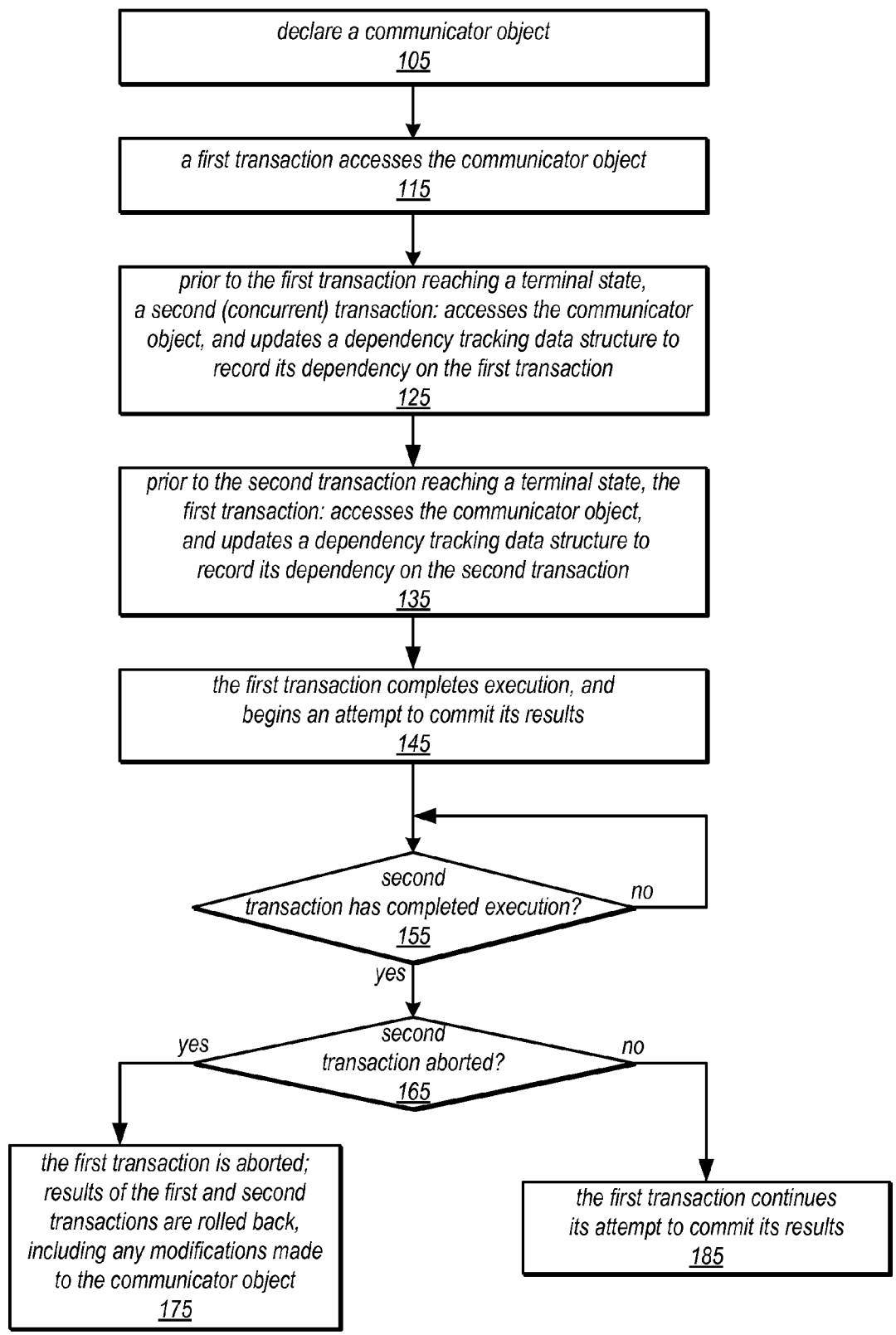
Figure 1C:
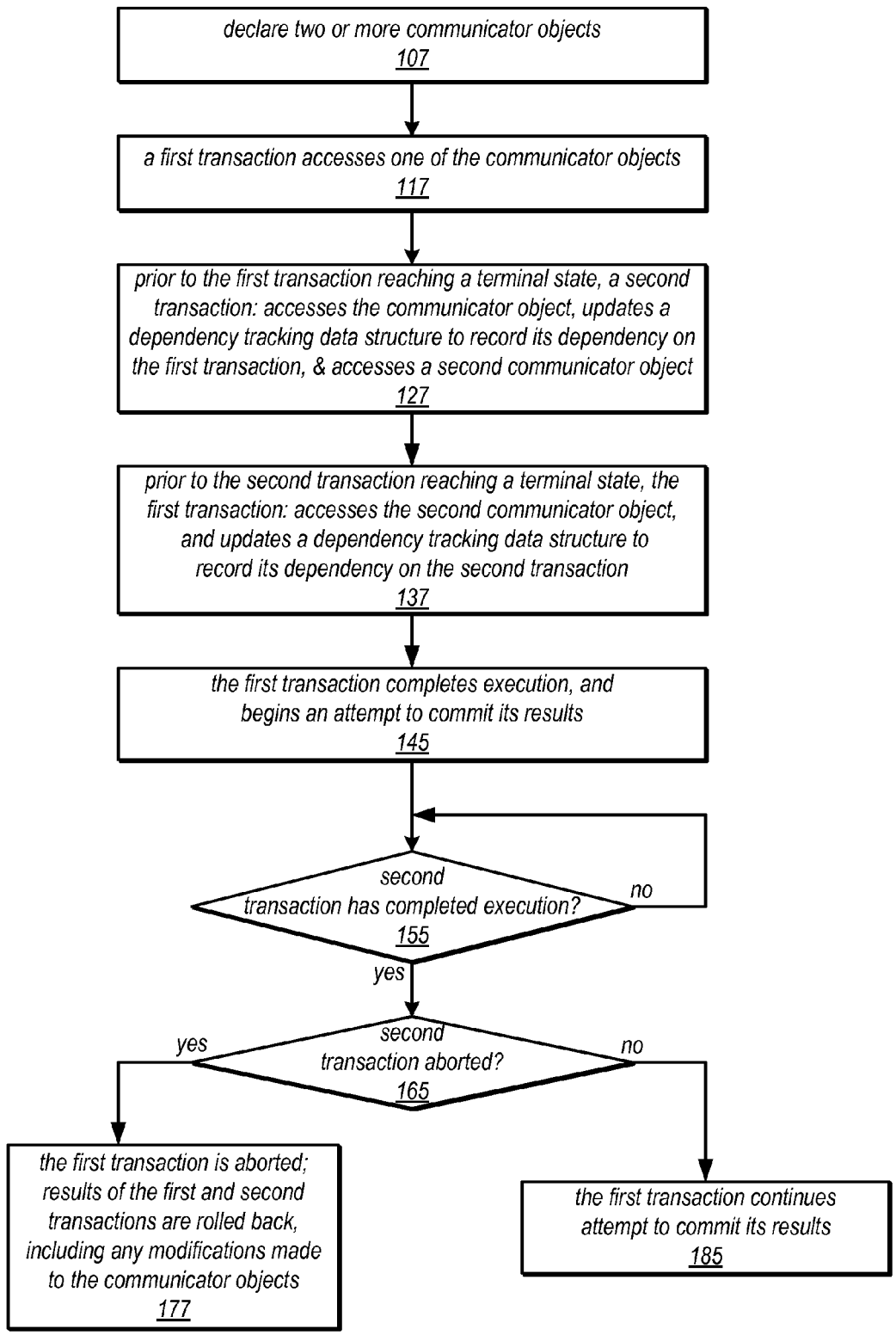

Another embodiment of a method for employing special communicator objects to enable communication between concurrent transactions is illustrated in FIG. 1B. As in the previous example, the method may include explicitly declaring a communicator object, as in 105. For example, in some embodiments, a communicator may be declared as an instance of a transaction communicator class. As described in more detail below, objects of this class may include a data field (or data object portion) that can be modified by and visible to concurrent transactions using methods defined for the class. As illustrated at 115 in this example, the method may include a first transaction accessing the communicator object (e.g., to read and/or write to the data field).

As illustrated at 125 in FIG. 1B, the method may include, prior to the first transaction reaching a terminal state (e.g., prior to the first transaction aborting, committing its results, or reaching another state indicating that it will abort or commit), a second (concurrently executing) transaction accessing the communicator object. The second transaction may update a dependency tracking data structure (e.g., a dependency list or other tracking structure) to record the fact that the second transaction is dependent on the first transaction. As described herein, this may in some embodiments create a dependency relationship between the first and second transactions. As illustrated at 135, the method may include, prior to the second transaction reaching a terminal state (e.g., prior to the second transaction aborting, committing its results, or reaching another state indicating that it will abort or commit), the first transaction accessing the communicator object a second time, and updating a dependency tracking data structure to record the fact that the first transaction is dependent on the second transaction. Thus, a mutual dependency relationship is established between the first and second transactions.

Once the first transaction has completed execution (i.e. once all of the instructions within the atomic scope of the first transaction have been executed), the first transaction may begin an attempt to commit its results, as in 145. At this point, if the second transaction has not yet completed execution, shown as the negative exit from 155, the method may include the first transaction waiting to complete its attempt to commit until the second transaction has completed execution, shown as the feedback to 155. If the second transaction has completed execution (or after waiting for the second transaction to complete execution), shown as the positive exit from 155, the method may include determining whether the second transaction aborted, as in 165.

As described herein, mutually dependent transactions must either both commit or both abort. The example illustrated in FIG. 1B this dependency has been established due to fact that the transactions have updated a dependency tracking data structure to record their mutual dependency. Therefore, if the second transaction aborted, shown as the positive exit from 165, the method may include the first transaction aborting, as in 175. In this case, the method may include the results of the first and second transactions being rolled back, including any modifications made to the communicator object. If the second transaction did not abort, shown as the negative exit from 165, the method may include the first transaction continuing its attempting to commit its results, as in 185.

Yet another embodiment of a method for employing special communicator objects to enable communication between concurrent transactions is illustrated in FIG. 1C. As in the previous examples, the method may include explicitly declaring one or more communicator objects, as in 107, where a communicator may be declared as an instance of a transaction communicator class, and where objects of this class may include a data field (or data object portion) that can be modified by and visible to concurrent transactions using methods defined for the class. As illustrated at 117 in this example, the method may include a first transaction accessing one of the communicator objects (e.g., to read and/or write to the data field).

As illustrated at 127 in FIG. 1C, the method may include, prior to the first transaction reaching a terminal state (e.g., prior to the first transaction aborting, committing its results, or reaching another state indicating that it will abort or commit), a second (concurrently executing) transaction accessing the communicator object. The second transaction may update a dependency tracking data structure (e.g., a dependency list or other tracking structure) to record the fact that the second transaction is dependent on the first transaction. As described herein, this may in some embodiments create a dependency relationship between the first and second transactions. In the example illustrated in FIG. 1C, the second transaction may then access a second communicator object (e.g., to read and/or write to the data field). As illustrated at 137, the method may include, prior to the second transaction reaching a terminal state (e.g., prior to the second transaction aborting, committing its results, or reaching another state indicating that it will abort or commit), the first transaction accessing the second communicator object, and updating a dependency tracking data structure to record the fact that the first transaction is dependent on the second transaction. Thus, a mutual dependency relationship is established between the first and second transactions.

At this point, the method illustrated in FIG. 1C may continue in a manner similar to that illustrated in FIG. 1B. For example, once the first transaction has completed execution (i.e. once all of the instructions within the atomic scope of the first transaction have been executed), the first transaction may begin an attempt to commit its results, as in 145. At this point, if the second transaction has not yet completed execution, shown as the negative exit from 155, the method may include the first transaction waiting to complete its attempt to commit until the second transaction has completed execution, shown as the feedback to 155. If the second transaction has completed execution (or after waiting for the second transaction to complete execution), shown as the positive exit from 155, the method may include determining whether the second transaction aborted, as in 165.

As described herein, mutually dependent transactions must either both commit or both abort. The example illustrated in FIG. 1C this dependency has been established due to fact that the transactions have updated a dependency tracking data structure to record their mutual dependency. Therefore, if the second transaction aborted, shown as the positive exit from 165, the method may include the first transaction aborting, as in 177. In this case, the method may include the results of the first and second transactions being rolled back, including any modifications made to the communicator objects. If the second transaction did not abort, shown as the negative exit from 165, the method may include the first transaction continuing its attempting to commit its results, as in 185.

In transactional memory implementations without communicators, the transaction order for a parallel program may be thought of as an overall order of all committed transactions such that each transaction appears to be executed serially in that order. In some embodiments of the system and methods described herein, transactions that access a common communicator (or in a chain of transactions, each adjacent pair of which access a common communicator) may not need to be strictly ordered by this transaction order. The operations of transactions not ordered by the transaction order may appear to be interleaved in any way that is consistent with the sequential semantics of each transaction. In some embodiments, these transactions may commit, as long as they do not make any conflicting accesses to non-communicator objects. In some embodiments, transactions that occupy the same position in the transaction order (e.g., transactions that have a dependency relationship and that commit together) may be thought of as a single "super-transaction", and these resulting super-transactions may all be isolated from one another, just as ordinary transactions (i.e. transactions without communicators) would be. In some embodiments, these semantics may be guaranteed by tracking the dependencies between various transactions.

In order to track dependencies among transactions, the system must first determine when one transaction depends on another. In general, one transaction may be said to depend on another transaction if it sees some effect that is caused by the other transaction. In some embodiments, a simple rule may be applied to maintain a conservative approximation of the dependencies between transactions. Note that the system may only need to track dependencies between active transactions. This is because a transaction should not see any effects of an aborted transaction (if it does, it must also abort), and once a transaction has committed, any other transaction may see its effects. In addition, because transactions are guaranteed to execute in isolation except for accesses to transaction communicators, dependencies can arise only from accesses to these communicators.

In some embodiments, the system may apply the following dependency rule: a transaction T that accesses a communicator depends on any active transaction that accessed the communicator in the past. Using this approach, the system may aggressively enforce dependencies between transactions that access communicators, and may in some cases force unnecessary mutual dependencies between transactions. In other embodiments, the system may apply a refined version of this dependency rule. For example, the rule may specify that a first transaction that accesses a communicator depends on any transaction that accessed the communicator before the first transaction completed its access. This rule may be sufficient for some application domains. However, it may still be too conservative for the general case because any transactions with overlapping accesses to a communicator may be considered mutually dependent by this rule, even when there may not be a true dependency relationship between them.

Some embodiments may operate under the assumption that communicator object fields can be accessed using read and write operations (and using compare-and-swap type operations, which are composites of read and write operations). In some such embodiments, a dependency rule may specify that a transaction that reads or writes a communicator object depends on prior active readers and writers of the communicator. This approach is also conservative and may lead to extraneous dependencies (e.g. read-after-read dependency relationship) not related to the flow of data between transactions. Other embodiments may not enforce read-after-read dependencies thereby providing greater concurrency.

In some embodiments, a transaction may be considered to be dependent on another transaction whose effects it sees. For read-write memory, this may mean that a transaction T that reads a value depends on another transaction that wrote that value, i.e. a read-after-write dependency. When a transaction T attempts to commit, in addition to validating its read set, as usual, it may also check the status of all the transactions on which it depends. If all of them have committed, then transaction T may also be allowed to commit its results. Otherwise, transaction T may have to wait until all the uncommitted transactions on which it depends are attempting to commit. If any of them abort, then transaction T must also abort. Note that because communicators permit communication between transactions, there may be a cycle of dependencies in the set of transactions attempting to commit. In this case, the system may validate all the transactions (as with ordinary transactions), and then commit all of them together. As noted above, in this case the transactions may be considered to be at the same position in the transaction order.

In some embodiments, the system may only track read-after-write dependencies (i.e. true data-flow dependencies), but not write-after-read dependencies (i.e. anti-dependencies) or write-after-write dependencies (i.e. output dependencies) because write operations do not see the effects of previous operations. In fact, in some cases, the system may not even need to track all true dependencies because a read access may see only the effects of the most recent write operation, and not the effects of any other writes that preceded it. In some embodiments, the system may not track exactly the minimum set of dependencies necessary to guarantee the correct semantics. However, it may not be necessary to do so. Maintaining more dependencies than absolutely necessary may cause more transactions to abort than necessary, but may preserve the semantics of committed transactions. Therefore, when selecting dependencies rules for a given implementation of the methods described herein, the cost of more complicated tracking of dependencies may be weighed against the cost of more transactions aborting than absolutely necessary. In general, the system may need to ensure that any extra dependencies do not interfere with progress guarantees by forming a cycle of dependent transactions that cannot be committed (for example, by having transactions that conflict with each other on accesses to non-communicator objects). However, to simplify maintaining the global transaction order, the system may enforce all types of dependencies, including read-after-write (true), write-after-write (output), and write-after-read (anti-) dependencies.

Figure 2:
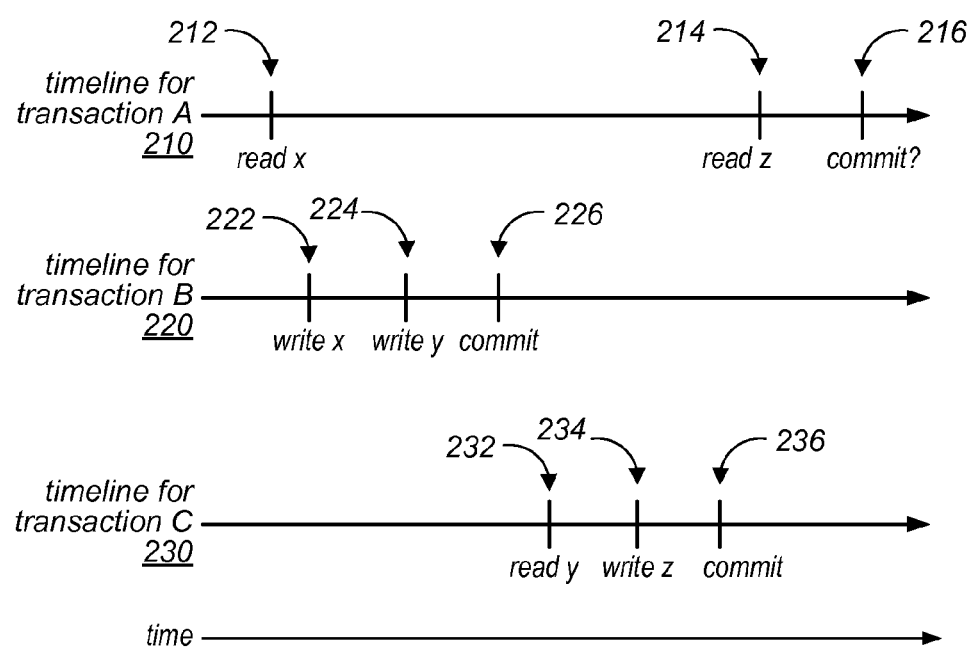
FIG. 2 illustrates an example of the execution of multiple transactions that access shared objects, according to some embodiments.

The systems described herein may in some embodiments need to validate transactions properly before they commit in order to preserve correct (or at least consistent) transaction ordering. Consider, for example, the execution depicted in FIG. 2. This example illustrates the need for proper validation of communicator objects accessed by communicating transactions, according to some embodiments. In this example, transactions A, B, and C execute concurrently, up to the point at which they commit (or attempt to commit), and the timelines illustrated in FIG. 2 are assumed to be concurrent in time (i.e. they begin and end at the same time and use the same time scale). In this example, x is a communicator object, but y and z are not (i.e. accesses to objects y and z are isolated within a given transaction). In this example, transaction A (whose object accesses are shown along timeline 210) reads communicator object x (at time 212), and reads non-communicator object z (at time 214). Transaction B writes a value to communicator object x (at time 222 on timeline 220), writes a value to non-communicator object y (at time 224), and then commits its results (at time 226). Transaction C reads non-communicator object y (at time 232 on timeline 230), writes a value to non-communicator object z (at time 234), and then commits its results (at time 236).

In this example, transaction A sees the value of z that was written by transaction C, since transaction C committed its results before transaction A read the value of z. Similarly, transaction C sees the value of y that was written by transaction B, since transaction B committed its results before transaction C read the value of y. However, transaction A sees the value of communicator object x prior to transaction B writing a new value to communicator object x. Therefore, transaction A must not commit (e.g., at 216) because in order to maintain ordering consistency, it must be ordered before or together with B (since A saw the value of x prior to its write by B), and after C (since A sees the value of z written by C). However, B must be ordered before C (since C sees the value of y written by B). In this example, transaction A should fail validation (and therefore abort) because when it tries to commit, the committed value of x is neither the value that A read nor a value written by a transaction that commits together with A (since B is already committed).

In other embodiments, under this scenario, the system could have introduced a dependency from A to B (i.e., it could track anti-dependencies), in which case B's commit would have been delayed until A attempted to commit. In that case, C would not see the value of y written by B. In that example, if all of the transactions commit (i.e. if the conflict between B and C does not force one or the other to abort), C would be ordered first, and A and B would be ordered together.

Note that some embodiments that preserve "ordering dependencies" between transactions may define dependency relationships quite conservatively. For example, in such embodiments, if a transaction A writes to a communicator object O, then a transaction B writes to O, B may be designated as being dependent on A by the virtue of a write-after-write ordering dependency relationship. As a result, if A aborts, B must also abort. However, in this case there is no real "data flow" dependency relationship between the two transactions, and B may not actually need to abort if A aborts. However, in this example, if A and B both commit, B must not commit before A commits, in order to preserve the ordering relationship between A and B (i.e. A happens before B). A similar argument may be made for tracking write-after-read (anti-) dependencies. In other embodiments, the system may enforce a more relaxed form of happens-before ordering dependency relationship between transactions than that of these conservative approaches.

In some embodiments a transaction that is reading or writing a transaction communicator may be forced to depend only on the last writer of that communicator. This approach may eliminate the tracking of even anti-dependencies between transactions. However, this approach may still create unnecessary write-after-write dependencies between transactions. In other embodiments, such write-after-write dependencies may also be eliminated, e.g., the runtime implementation may enforce only read-after-write dependencies. In such embodiments, a transaction that only writes to one or more communicator fields but does not read any communicator fields does not depend on any other transactions. This is because the transaction does not see any effects of other transactions. It merely causes an effect that other transactions can see. Note, however, that systems employing this dependency rule may not maintain all read-after-write dependencies. For example, in such embodiments, if two transactions write to a communicator field consecutively and then a third transaction reads the communicator field, the third transaction depends only on the second writer transaction, and the first writer transaction can abort without affecting the other two.

Figure 3:
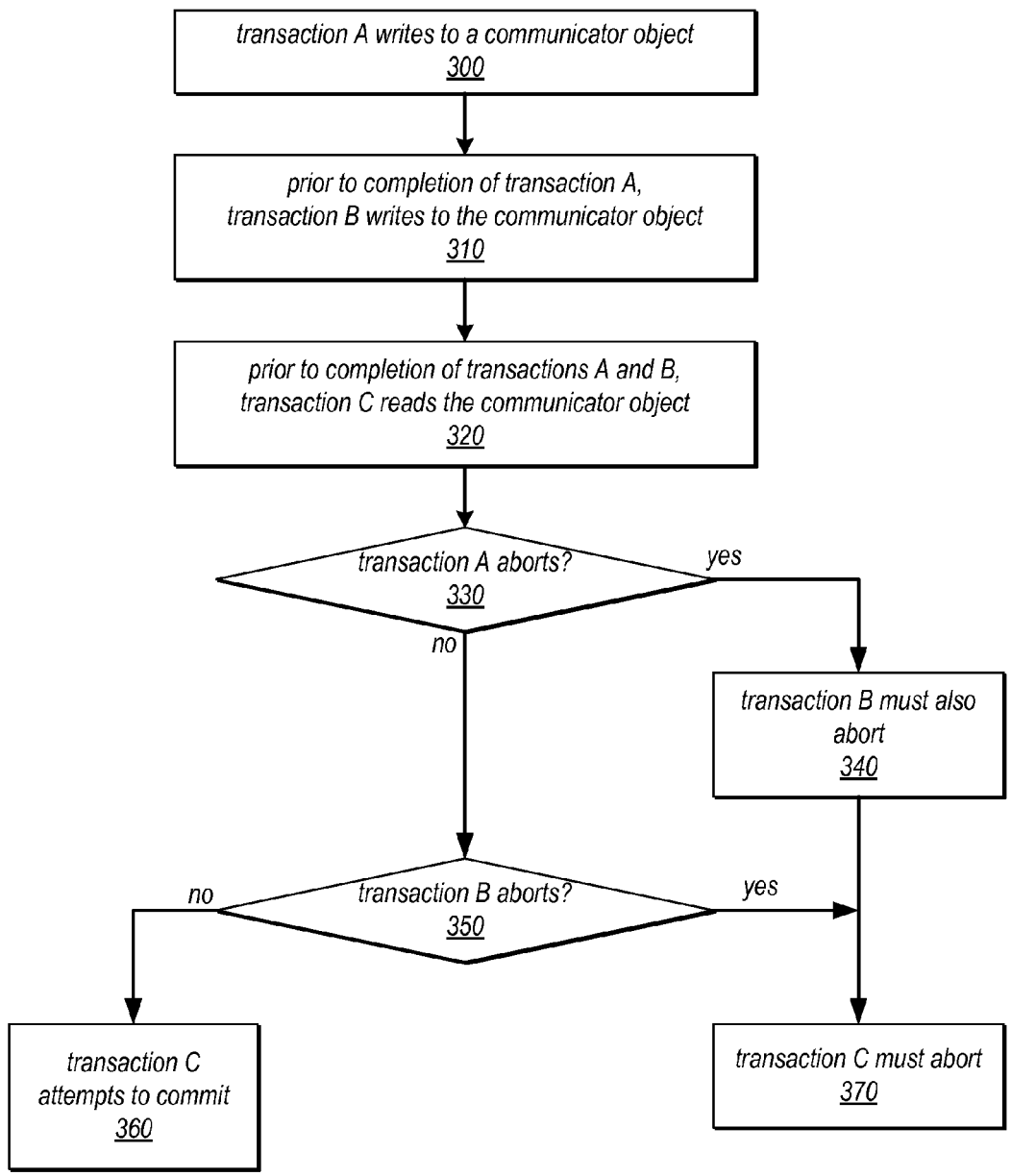
FIG. 3 is a flow diagram illustrating one embodiment of a method for determining and enforcing data flow and ordering dependencies between concurrent transactions that access a communicator object.

One embodiment of a method for determining and enforcing data flow and ordering dependencies between concurrent transactions that access a communicator object is illustrated in FIG. 3. In this example, a transaction A writes to a communicator object, as in 300. In this example, it is assumed that there are no active prior writers of the communicator object (or any other communicator objects that are written by transaction A). Therefore, transaction A is not dependent on any other transaction, and can abort or commit on its own. As illustrated at 310, prior to the completion of transaction A, a transaction B writes to the communicator object. As previously described, this may create a write-write ordering dependency between transactions A and B, in some embodiments. In addition, prior to the completion of transactions A and B, in this example, a transaction C reads the value of the communicator object, as in 320. Therefore, in this example, transaction C is dependent on transaction B but not transaction A. In other words, transaction A can abort with no effect on transaction C, but if transaction B aborts, transaction C must abort.

Therefore, as illustrated in FIG. 3, if transaction A aborts (shown as the positive exit from 330), transaction B must also abort (as in 340) in order to preserve the write-write ordering dependency between these two transactions, if ordering is to be maintained. In embodiments in which ordering is not necessarily maintained, transaction B may not be dependent on transaction A, and the method illustrated in FIG. 3 may skip from 320 to 350, ignoring the abort of transaction A. In this example, if transaction A does not abort, shown as the negative exit from 330, but transaction B aborts, shown as the positive exit from 350, transaction C must also abort (as in 370). However, if transaction B does not abort, shown as the negative exit from 350, transaction C may be allowed to attempt to commit its results (as in 360).

In some embodiments, transaction communicators may be language-level objects that contain communicator fields (e.g., fields annotated with a special communicator type modifier, as described above), and transactional accesses to these fields are not isolated. In other embodiments of this invention, all of the fields of a communicator object may be accessed by a transaction in a non-isolated fashion. In such embodiments, the communicator object may be identified as such in several ways, including but not limited to, using class-level language annotations, through inheritance from a special communicator library class, using type modifiers for object references, etc. Some of these techniques (e.g. type modifiers for variables) may be applied to non-object-oriented languages, such as C, as well.

In some embodiments, a transaction support library may be extended to support transaction communicators. For example, this support may be added to a transaction support library that supports obstruction-free execution of memory transactions by managing concurrent accesses to shared transactional objects (e.g., using a TMObject class). Such a transaction support library may provide programmer interfaces for transactions to access TMObjects, and interfaces to support beginning and committing transactions. Transaction support libraries that are extended to support transaction communicators may include a dependency-tracking framework and support for objects that include special communicator fields and atomic blocks that isolate accesses to transaction communicator objects.

In some embodiments, a transaction communicator may be an ordinary Java™ object with special communicator fields (e.g., fields identified using a special language-level "txcomm" modifier, or some other technique). In such embodiments, the compiler may translate the communicator field accesses to accesses to special TxCommXXX objects (where XXX represents a Java™ primitive type). For example, for type "int", there may be a Java™ class called TxCommInt, and for a reference type there may be a Java class called TxCommObject. In this example, the programmer may use the appropriate TxCommXXX type to emulate the txcomm field of the corresponding XXX type. For example, the declaration txcomm int count may be written as TxCommInt count. In the descriptions that follow, the term TxCommObject may be used to represent any or all TxCommXXX types. Similarly, in some embodiments, a language-level "txcommatomic" modifier may be used to designate atomic blocks that isolate accesses to transaction communicator objects.

In various embodiments, a TxCommObject may include fields that contain (i) a reference (data) of type Object, i.e. the data for the field that the TxCommObject represents; (ii) a reference to the last transaction (lastWriter) that wrote to the TxCommObject, which may be used to track dependencies between transactions; and (iii) a reference to the transaction that currently "owns" the TxCommObject, which may act as a lock to guarantee isolation of accesses to TxCommObjects within txcommatomic blocks.

For example, the structure of a TxCommObject may in some embodiments be as follows:

```
TxCommObject {
    Object data;
    Transaction lastWriter;
    Transaction currentOwner;
}
```

Some embodiments may enforce write-after-read (anti-) dependencies by adding a special "readers" list to the TxCommObject as follows:

```
TxCommObject {
    Object data;
    Transaction lastWriter;
    List<Transaction> readers;
    Transaction currentOwner;
}
```

The TxCommObject class may provide get and set methods that transactions use to read and write the fields represented by the TxCommObject. In some embodiments, these methods may update both the appropriate fields of the TxCommObject and the dependency list of the invoking transaction. For example, the get method may ensure that the last writer of the TxCommObject (if it is still active) is on the dependency list of the invoking transaction (thus allowing the invoking transaction to track a true dependency), and the set method may ensure that the last writer and any prior readers (i.e. those that are still active) are on the dependency list of the invoking transaction (thus allowing the invoking transaction to track anti-dependencies and write-write dependencies). As noted above, in some embodiments, the system may track all dependencies (true, anti-, and write-write) rather than complicating validation by ignoring some of these dependencies.

In some embodiments, the transaction commit protocol may ensure that all dependencies between transactions are preserved, i.e. that a transaction cannot commit unless all transactions on its dependency list are guaranteed to commit. In some embodiments, the commit protocol may include the detection of cycles in the dependency graph. In some embodiments, mutually dependent transactions may be guaranteed to commit or abort together, as described above in reference to a super-transaction.

In some embodiments, methods may be added to threads for beginning and committing communicator-isolating transactions (e.g., txcommatomic blocks), and for keeping a counter for the nesting depth of communicator-isolating transactions. For example, in one embodiment, a TxCommBegin method may be used to increment such a counter, and a TxCommCommit method may be used to decrement it. In some such embodiments, if a communicator is accessed within a communicator-isolating transaction (i.e. if the counter is nonzero) then the transaction may take ownership of the communicator (i.e. by writing an identifier or itself into the "owner" field of the TxCommObject), provided the communicator is not already owned. If the communicator is already owned, the transaction may abort. In some embodiments, a transaction may retain ownership of a communicator while the transaction is active. When the transaction commits, it may merge its read and write sets into its parent's read and write sets (just as with ordinary closed nested transactions), and it may relinquish ownership of all the communicators it accessed (e.g., it may set their owner fields to null). Communicator-isolating transactions are described in more detail below.

Figure 4A:
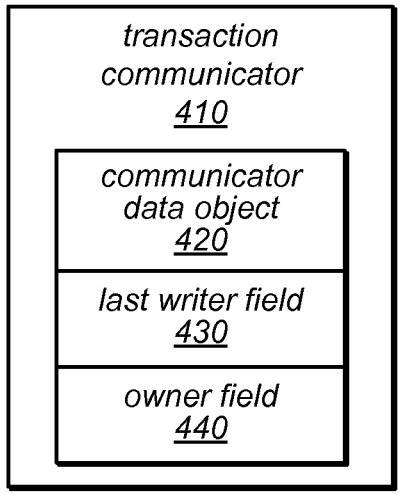
FIGS. 4A and 4B are block diagrams illustrating a transaction communicator, according to different embodiments.
Figure 4B:
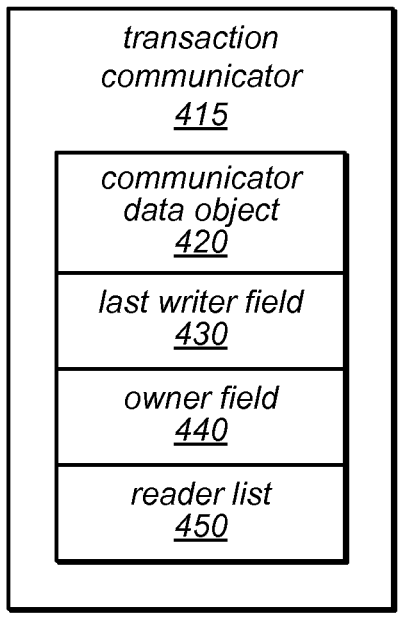

FIGS. 4A and 4B are block diagrams illustrating a transaction communicator 410, according to different embodiments. Transaction communicator 410, illustrated in FIG. 4A, includes a communicator data object 420 (i.e. a data object portion of transaction communicator 410, through which concurrent transactions may communicate with each other, as described herein). It also includes a last writer field 430 (the value of which represents an identifier of the transaction that most recently wrote a value in communicator data object 420), and an owner field 440 (the value of which represents an identifier of the transaction that currently holds ownership of transaction communicator 410). As described above, accesses to communicator data object 420 (and/or other fields of transaction communicator 410) by a given transaction may not be isolated with respect to other concurrently executing transactions with which the given transaction has a dependency relationship. Transaction communicator 415, illustrated in FIG. 4B, also includes a communicator data object, a last writer field 430, and an owner field 440, such as those described in reference to FIG. 4A. However, transaction communicator 415 is FIG. 4B also includes a reader list 450. In this example, reader list 450 may include a list of identifiers of any transactions that have read the data object 420 of transaction communicator 415.

In some embodiments, the semantics of transaction communicators follows from a principle specifying that, except as necessary to allow inter-transaction communication, the semantics of ordinary transactions should be retained as much as possible when transactional memory implementations are extended to support transaction communicators. For example, a transaction may be able see changes to communicators made by other active transactions, but not changes made to other (non-communicator) objects by other active transactions. Also, transactions must see the effects of transactions that are earlier in the overall transaction order, and not those of transactions that are later in the overall transaction order. However, transactions that communicate with each other may commit together and may thereby occupy the same position in the transaction order, such that their operations may appear to be interleaved. Note that in various embodiments, no committed transaction may see the effects of an aborted transaction.

In some embodiments, the lastWriter field in a TxCommObject may serve as the anchor for identifying dependencies between transactions. In embodiments that support antidependencies, the readers field, such as reader list 450, may be sufficient to identify and enforce such dependencies. As described herein, the dependencies between transactions are identified and logged by a TxCommObject's get and set methods.

In typical STM runtimes, each transaction may maintain a transaction descriptor (i.e. a special data structure that represents a transaction). To track dependencies, such a transaction descriptor may be extended to include communicator-specific elements. For example, the descriptor may be augmented to include a dependency list (depList) that contains identifiers of all the transactions on which the transaction depends. A graph derived from interpreting the dependency lists of a set of transactions as adjacency lists may be referred to as a dependency graph. In one embodiment, a transaction descriptor may contain the following fields:

```
Descriptor {
    // STM specific fields
    Status state;
    ReadSet readSet;
    WriteSet writeSet;
    // Communicator specific elements
    DependenceList    depList;
    CommOwnershipSet  ownershipSet;
    CommUndoLog       commUndoLog;
}
```

Figure 5:
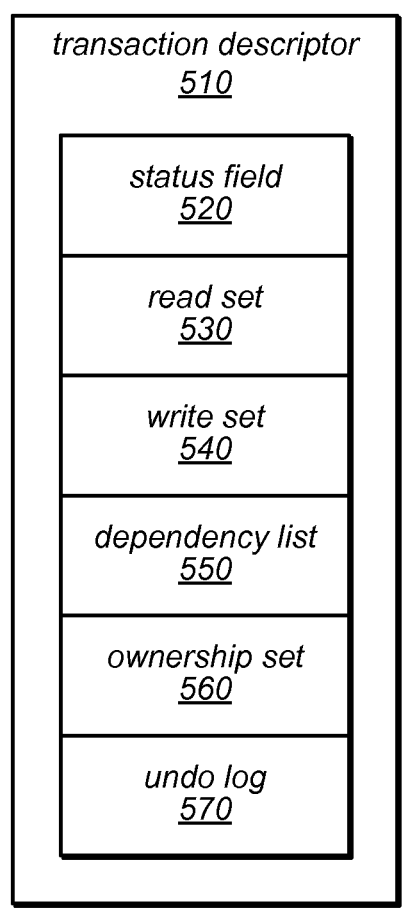
FIG. 5 is a block diagram illustrating a transaction descriptor, according to one embodiment.

FIG. 5 is a block diagram illustrating a transaction descriptor 510, according to one embodiment. In this example, transaction descriptor 510 includes the software transactional memory (STM) specific fields described above (e.g., status field 520, read set 530, and write set 540). In addition, transaction descriptor 510 includes communicator specific elements, as described above. For example, transaction descriptor 510 includes a dependency list 550, an ownership set 560 (which may include a set of identifiers indicating which, if any, transaction communicator objects are owned by the transaction), and an undo log 570 (in which modifications made by the transaction may be logged in case they need to be rolled back, e.g., if the transaction aborts).

In some embodiments, a transaction accesses the data field of a TxCommObject via its get and set methods. For example, get may return the current value of the data field, and set may write a new value in the data field. In some embodiments, the write operation in the set method may be a direct update to the data field (in other words, an undo log style write), and the old value of the data field may be logged in a special undo log of the invoking transaction for TxCommObject writes. This undo log may be used by the transaction to roll back updates it made to any TxCommObjects in the event that the transaction aborts.

In some embodiments, during execution of the get and set methods of a TxCommObject O, each transaction that accesses O may acquire exclusive ownership of O to avoid possible races with concurrent transactions that intend to access O. In some embodiments, this may be done by applying an atomic operation (e.g., a compare-and-swap type operation) on the currentOwner field of the TxCommObject object O. In some such embodiments, the transaction may release the ownership at the end of the get or set method. In cases in which the get or set method is called by a communicator-isolating transaction (which is described in more detail below), ownership of O may be retained by the caller until the end of the communicator-isolating transaction. This may ensure isolation of TxCommObject accesses within the scope of the communicator-isolating transaction.

In some embodiments, these methods may include a transaction T determining if the last writer of a TxCommObject O is still active. If so, transaction T may add that writer to its dependency list. In some embodiments, to preserve anti-dependencies, the implementation may be extended to observe and add the reader list field of TxCommObject O to transaction T's dependency list. In this way, during its execution, transaction T may continue to build the list of all transactions on which its fate directly depends. In addition, the set method, after creating a dependency relationship with the last writer, may include transaction T writing itself as the new last writer of O. Furthermore, transaction T may also write a new value in O's data field, while backing up the old value of the data field in transaction T's undo log (commUndoLog). In both get and set methods, transaction T may add O to its ownership set (ownershipSet).

Note that in some embodiments, if the last writer of O was committed, transaction T may not need to create a new dependency relationship. In some embodiments, transaction T may not create a dependency relationship even in cases in which the last writer of O is aborted. Note, however, that if the last writer aborted, transaction T may need to wait for the last writer to complete its rollback on O before transaction T reads the data field of O. This is because there may be no way to know if the current value in the data field of O is a pre-rollback value or a post-rollback value.

Note that the example embodiment described above does not support read sharing. However, it may be the case most applications that use transaction communicators will rarely use them. Therefore, scalability (which may provide the biggest motivation for read sharing) may not be an issue for communicators. In other embodiments, the system may provide support for read sharing of communicators in a manner similar to the way that read sharing of ordinary objects is done by an STM runtime (e.g., using read set maintenance and read set validation).

Figure 6:
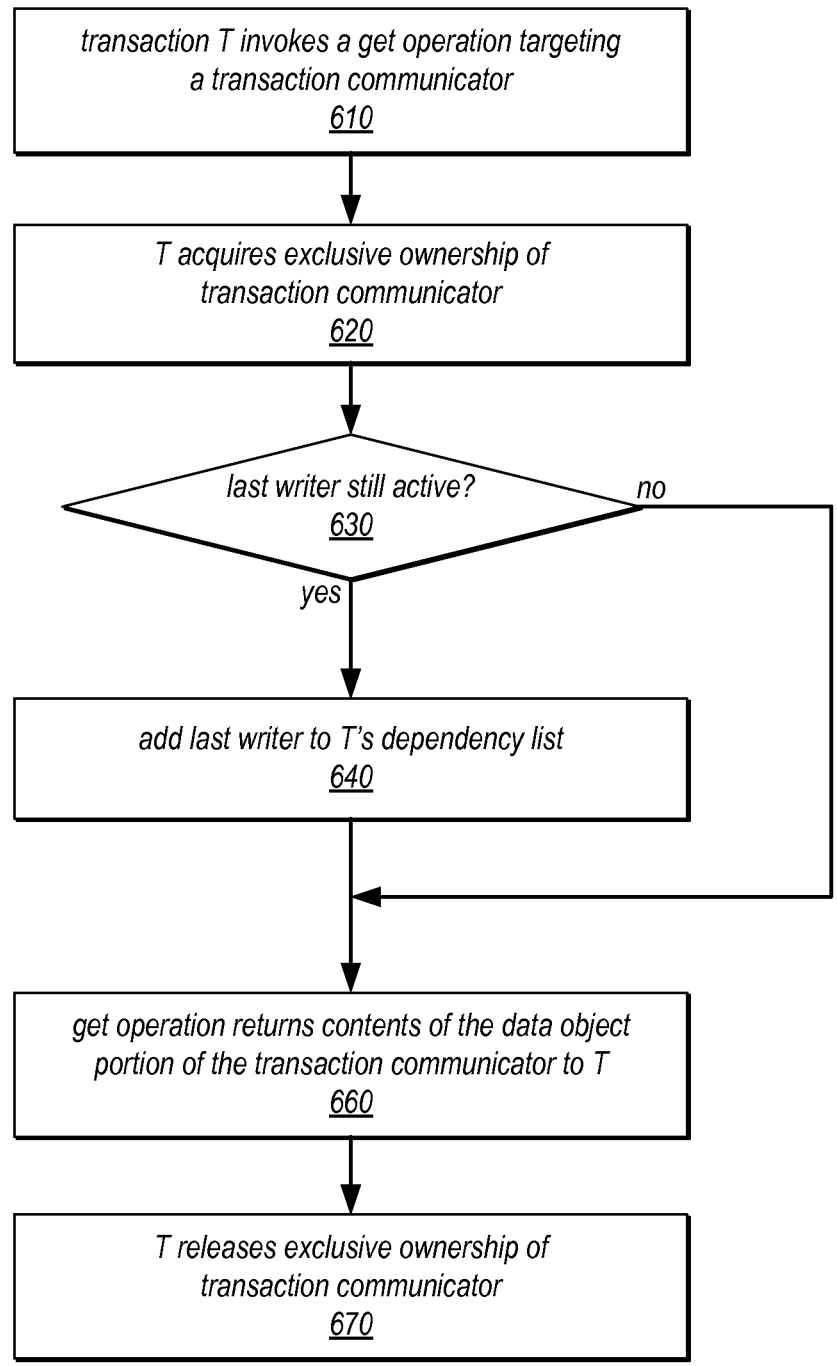
FIG. 6 is a flow diagram illustrating one embodiment of a get method, as described herein.

The get method described above may be further illustrated by the flow diagram in FIG. 6, according one embodiment. In this example, a transaction T invokes a get operation targeting a transaction communicator, as shown in 610. As illustrated at 620, as part of the get operation, transaction T may acquire exclusive ownership of the transaction communicator (e.g., using a compare-and-swap type operation to modify the owner field of the transaction communicator so that it identifies transaction T as the owner).

If the last writer (e.g., as identified in the last writer field of the transaction communicator) is still an active transaction (i.e. if it has not yet committed or aborted), shown as the positive exit from 630, the get operation may include adding the last writer transaction to the dependency list of transaction T, as in 640. As described above, if the last writer is not still active (i.e. if it has already committed or aborted), shown as the negative exit from 630, the get operation may not create a dependency relationship with the last writer, skipping the operation illustrated at 640.

Note that in some embodiments, the get operation may also add the transaction communicator's reader list to the dependency list of transaction T, (not shown). In other embodiments, such read-after-read dependencies may not be enforced. Once all of the appropriate dependencies have been recorded, the get operation may return the contents of the data object portion of the transaction communicator to transaction T, as in 660. Finally, transaction T may release exclusive ownership of the transaction communicator, as in 670. For example, in some embodiments, transaction T (as part of the get operation) may replace the identifier of transaction T in the owner field of the transaction communicator (e.g., using a compare-and-swap type operation) with a null or default value indicating that no transaction holds exclusive ownership of the transaction communicator. Note that in other embodiments, transaction T may retain ownership of the transaction communicator until the end of the transaction. For example, if transaction T is a communicator-isolating transaction, it may retain ownership of the transaction communicator until it has completed execution. However, in this case, ownership may be released prior to the end of an ordinary (i.e. non-communicator-isolating) transaction that encloses transaction T.

Figure 7:
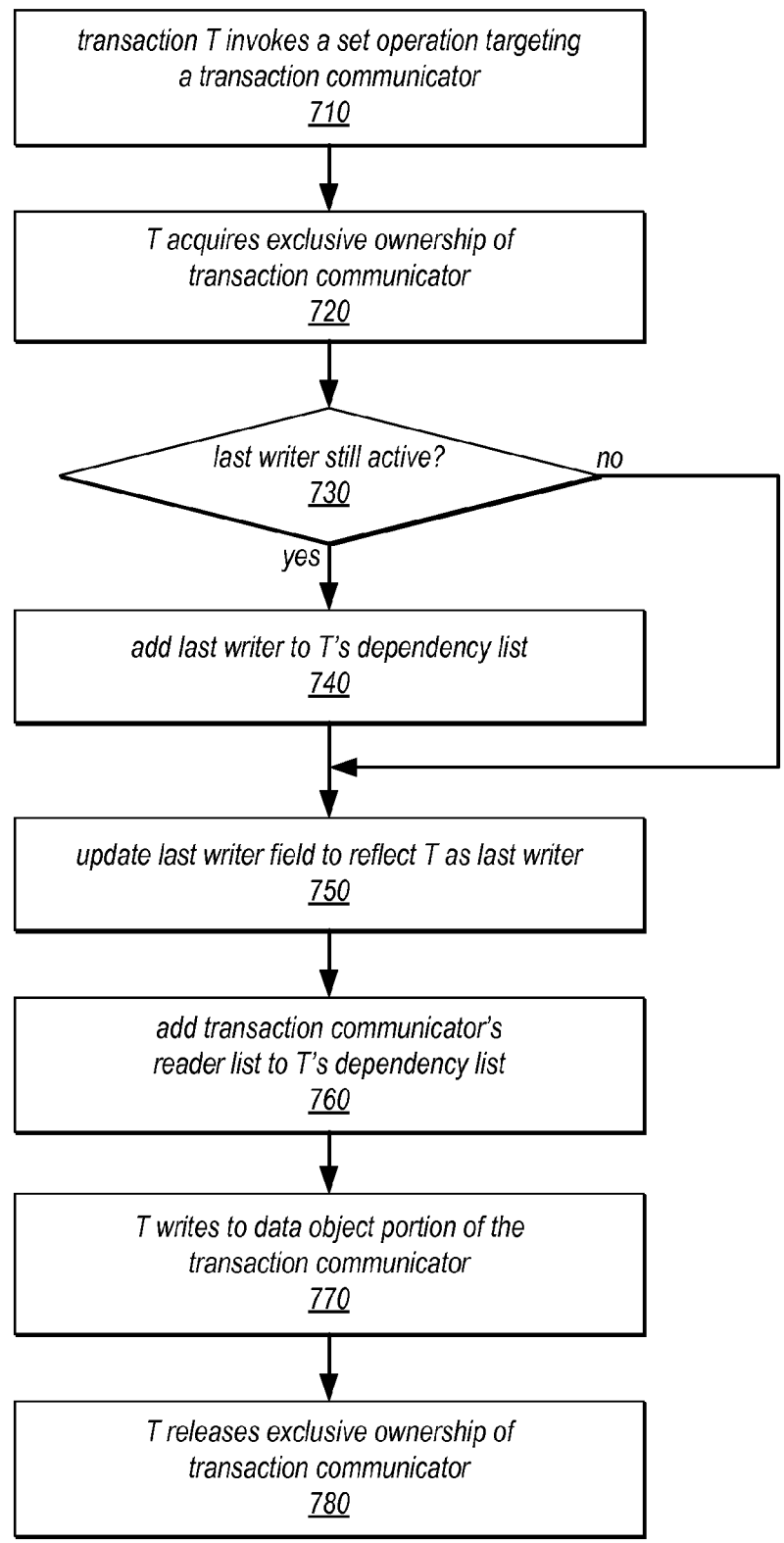
FIG. 7 is a flow diagram illustrating one embodiment of a set method, as described herein.

The set method described above may be further illustrated by the flow diagram in FIG. 7, according one embodiment. In this example, a transaction T invokes a set operation targeting a transaction communicator, as shown in 710. As illustrated at 720, as part of the set operation, transaction T may acquire exclusive ownership of the transaction communicator (e.g., using a compare-and-swap type operation to modify the owner field of the transaction communicator so that it identifies transaction T as the owner).

As with the get operation described above, if the last writer (e.g., as identified in the last writer field of the transaction communicator) is still an active transaction (i.e. if it has not yet committed or aborted), shown as the positive exit from 730, the set operation may include adding the last writer transaction to the dependency list of transaction T, as in 740. As described above, if the last writer is not still active (i.e. if it has already committed or aborted), shown as the negative exit from 730, the set operation may not create a dependency relationship with the last writer, skipping the operation illustrated at 740.

As illustrated at 750, the set operation may include updating the last writer field of the transaction communicator to reflect the fact that transaction T is writing to the data object portion of the transaction communicator. As illustrated in this example, the set operation may also add the transaction communicator's reader list to the dependency list of transaction T, as in 760. Once all of the appropriate dependencies have been recorded, the set operation may include transaction T writing to the data object portion of the transaction communicator, as in 770. Finally, transaction T may release exclusive ownership of the transaction communicator, as in 780. For example, in some embodiments, transaction T (as part of the set operation) may replace the identifier of transaction T in the owner field of the transaction communicator (e.g., using a compare-and-swap type operation) with a null or default value indicating that no transaction holds exclusive ownership of the transaction communicator. As noted above in reference to FIG. 6, in other embodiments, transaction T may retain ownership of the transaction communicator until the end of the transaction. For example, if transaction T is a communicator-isolating transaction, it may retain ownership of the transaction communicator until it has completed execution. However, in this case, ownership may be released prior to the end of an ordinary (i.e. non-communicator-isolating) transaction that encloses transaction T.

The commit protocol for a typical STM may be fairly simple: (i) validate the transaction's read set, (ii) atomically switch the transaction's state to committed, and (iii) perform the post-commit or post-abort clean up (write back updates to the shared memory and release ownership of all objects acquired during the transaction's execution, in the case of a commit, or roll back the results in the case of an abort). The commit process of transactions that access TxCommObjects may be complicated by the fact that the commit protocol must respect all inter-transaction dependencies. For example, a transaction T cannot commit until any of the transactions it depends on, directly or indirectly, are also guaranteed to commit.

Figure 8:
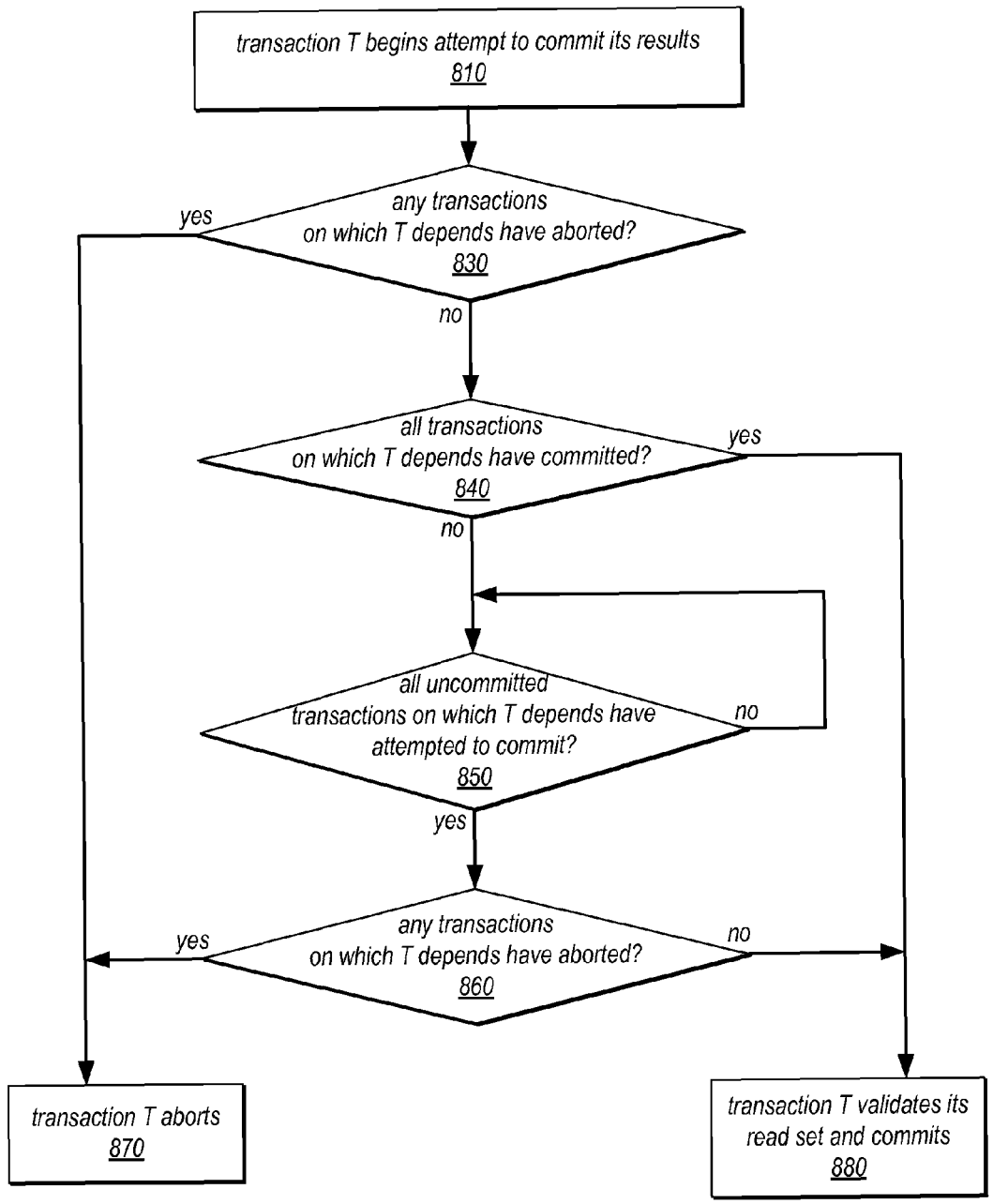
FIG. 8 is a flow diagram illustrating one embodiment of a method for committing a transaction that has accessed a transaction communicator.

One embodiment of a method for committing a transaction that has accessed a transaction communicator is illustrated by the flow diagram in FIG. 8. As illustrated in this example, the method may begin with a transaction T initiating an attempt to commit its results, as in 810. If any of the transactions on which transaction T depends have aborted, shown as the positive exit from 830, transaction T may abort, as in 870. If none of the transactions on which transaction T depends have aborted, shown as the negative exit from 830, and all of the transactions on which transaction T depends have committed, shown as the positive exit from 840, the method may include transaction T validating its read set and committing its results, as in 880. In this example, it is assumed that the read set validation is successful. However, if the read set validation is not successful, the method may include transaction T aborting (not shown).

As illustrated in this example, if not all of the transactions on which transaction T depends have committed, shown as the negative exit from 840, the method may include determining whether all uncommitted transactions on which transaction T depends have reached the point that they have at least begun an attempt to commit, as in 850. If any of them have not, shown as the negative exit from 850, the method may include waiting for all of the transactions on which transaction T depends to reach that point, shown as the feedback back to 850. Once all uncommitted transactions on which transaction T depends have at least begun an attempt to commit, shown as the positive exit from 850, the method may include again determining if any of these previously uncommitted transactions have since aborted, as in 860. If so, shown as the positive exit from 860, the method may include transaction T aborting, as in 870. If none of the previously uncommitted transactions have aborted, i.e. if all of them have committed, shown as the negative exit from 860, the method may include transaction T validating its read set and committing its results, as in 880. Again, in this example, it is assumed that the read set validation is successful. However, if the read set validation is not successful, the method may include transaction T aborting (not shown).

As described herein, as part of the commit protocol, transaction T may determine if it depends on any other transactions. If not, transaction T may validate its read set and, if the validation is successful, transaction T may then commit its results and atomically switch its state to committed. However, in some embodiments, if transaction T depends on any other transactions, transaction T may go through a new two-phase commit protocol. This new commit protocol may use the dependency lists of transactions to determine whether a transaction can commit its results. As noted above, the dependency lists of a set of transactions may collectively form a dependence graph in which transactions are the nodes of the graph. Each entry N in the dependency list of a transaction T may represent a directed dependence edge in the graph from a transaction T to the transaction of N. In other words, each edge in the graph incident on T may represent a dependency relationship indicating that transaction T's fate depends on the fate of node N's transaction. In order to commit, transaction T must ensure that all of the transactions on which it depends are also guaranteed to commit.

Figure 9A:
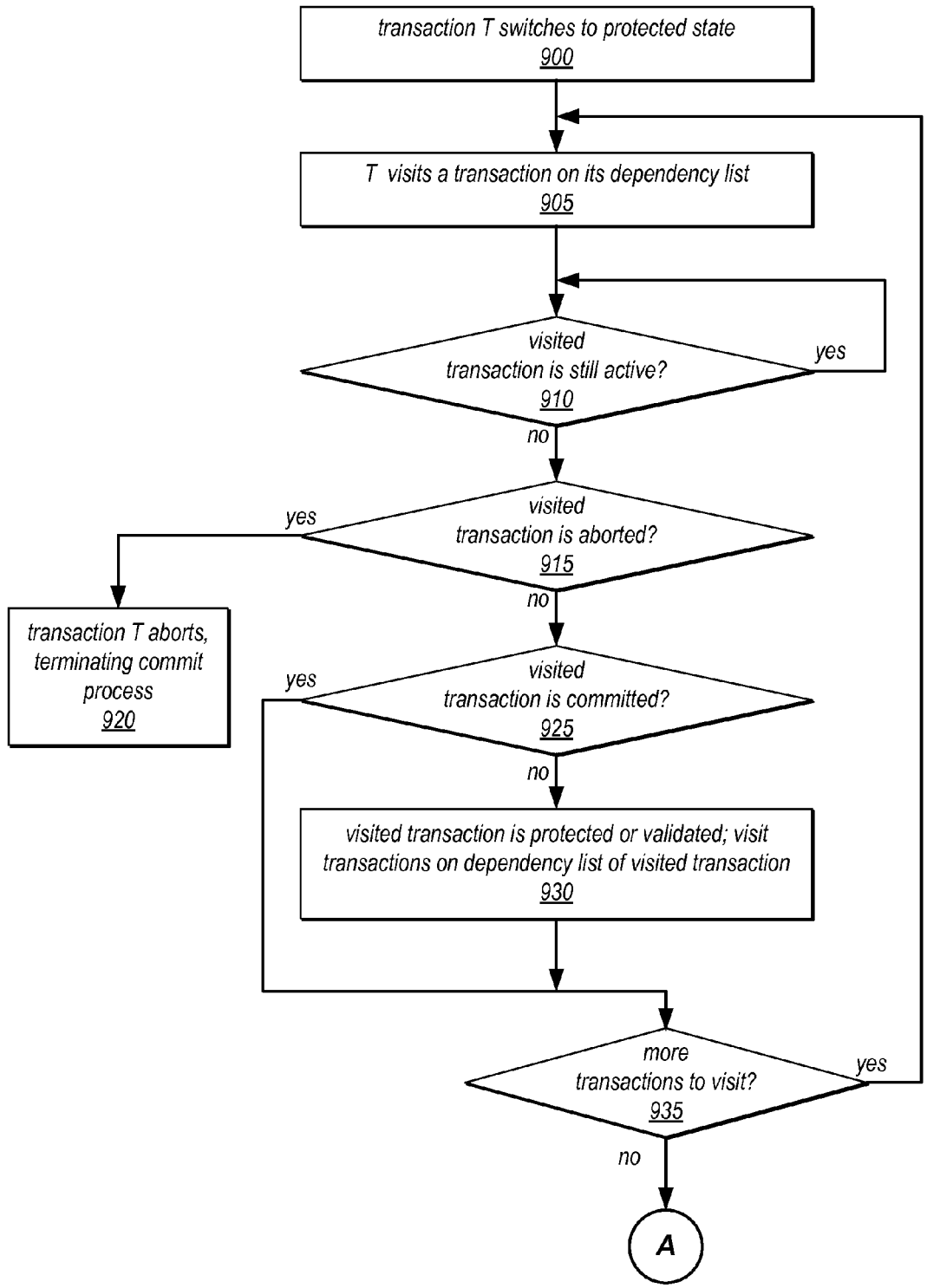
FIGS. 9A and 9B depict a flow diagram illustrating one embodiment of a method for committing the results of a transaction by following a dependence graph.
Figure 9B:
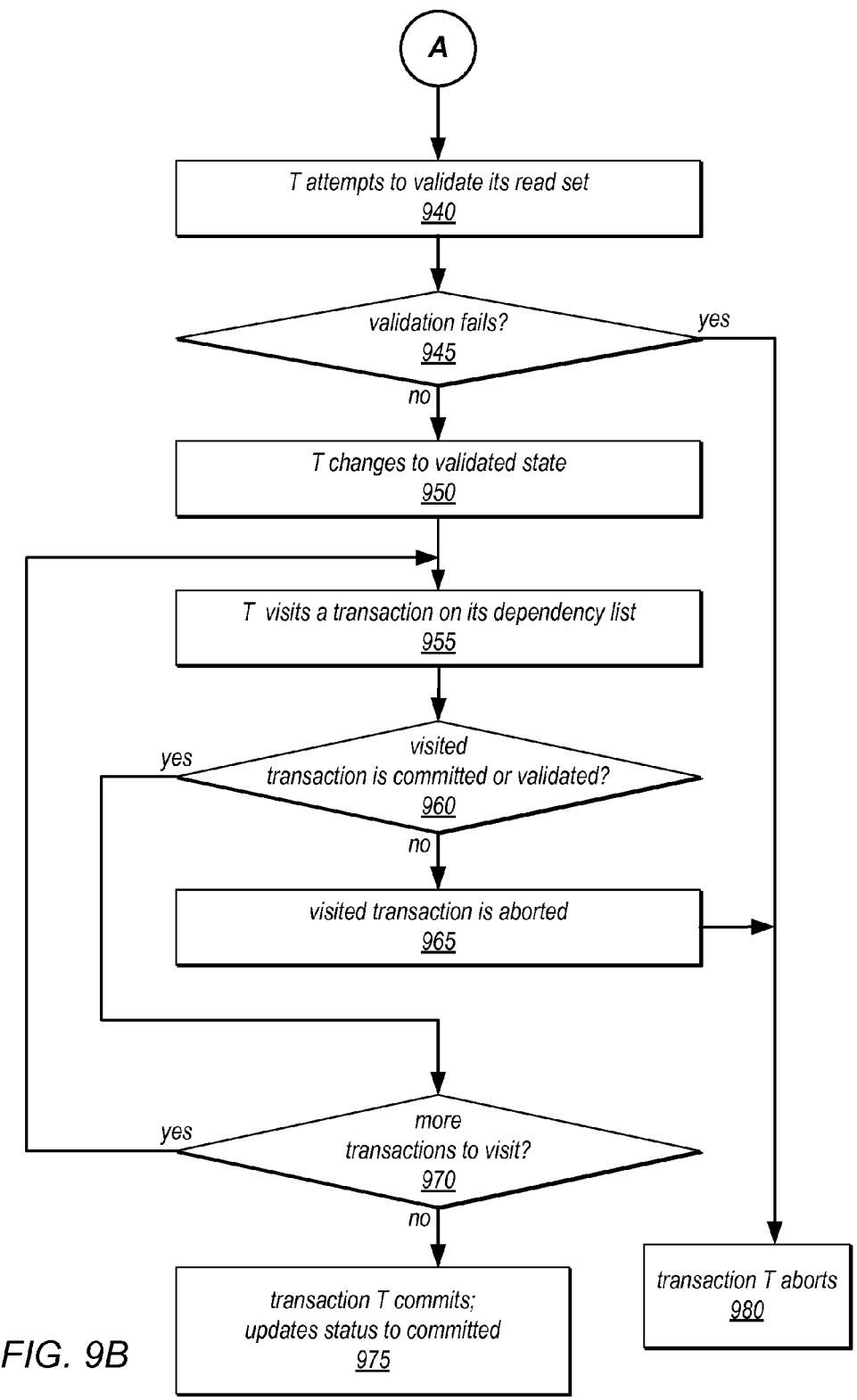

One embodiment of a method for committing the results of a transaction that accesses a transaction communicator by following such a dependence graph is illustrated by the flow diagram in FIGS. 9A-9B. Such a method may be performed when a transaction T that begins an attempt to commit its results is dependent on one or more other transactions, as described herein. Note that if transaction T does not depend on any other transactions (including situations in which there is a one-way dependency relationship in which another transaction is dependent on transaction T, but not vice versa), transaction T may validate its read set and (if successful) commit its results, without performing the operations illustrated in FIGS. 9A-9B. As illustrated at 900 in FIG. 9A, before traversing a dependence graph to which transaction T belongs, transaction T may in some embodiments atomically switch its state to a new "protected" state. A protected state may be used to indicate that a transaction has begun an attempt to commit its results. In some embodiments, no other transaction can directly abort transaction T while transaction T is in the protected state. In some such embodiments, a protected transaction may only be aborted for one of the following reasons: (i) one or more of the transactions on which it directly or indirectly depends aborts first; or (ii) a subsequent read validation of transaction T fails. After switching its state to protected, transaction T may recursively traverse the dependence graph, starting from its own dependency list.

As illustrated at 905, the method may include transaction T visiting one of the transactions on its dependency list. In some embodiments, transaction T may only visit transactions that are reachable from its dependence graph in a depth-first manner. As illustrated at 910, when transaction T visits a transaction on its dependency list, the method may include determining whether the visited transaction is still active. If so, shown as the positive exit from 910, the method may include transaction T waiting for the state of the visited transaction to change, shown as the feedback loop to 910. Note that in some embodiments, the method may include visiting other transactions while waiting for the state of an active visited transaction to change (not shown). If the visited transaction is not active, shown as the negative exit from 910, the method may include transaction T determining whether the visited transaction is aborted, as in 915. If that is the case, shown as the positive exit from 915, the method may include transaction T aborting and terminating its commit process, as in 920.

If the visited transaction is not in the committed state, shown as the negative exit from 925, it must be in the protected state or already validated (but not yet committed), in this example. In this case, the method may include transaction T continuing with its depth-first search on the "children" of the visited transaction (i.e. on the transactions in the dependency list of the visited transaction), as in 930. If the visited transaction is in the committed state, shown as the positive exit from 925, the commit operation may guarantee that all transactions reachable from the visited transaction (i.e. all transactions on which the visited transaction depends) are also committed. Therefore, transaction T may not need to visit any of the transactions on the dependency list of the visited transaction. In other words, the method may skip the operations illustrated at 930 in this case, as transaction T may stop searching beyond the visited transaction, and may go back to the parent of the visited transaction looking for a different child to visit. In either case (i.e. whether transaction T traverses the dependency list of the visited transaction, or goes back to the parent of the visited transaction to look for another transaction to visit, the method may include repeating the operations illustrated in FIG. 9A for these additional transaction, shown as the positive exit from 935. As illustrated in this example, when transaction T completes its depth-first search (shown as the negative exit from 935), it may be guaranteed that each transaction on which transaction T directly or indirectly depends is either in the protected state or the committed state. At this point, the method may continue from the point illustrated as circle A in FIG. 9B.

As illustrated in FIG. 9B, if transaction T has not aborted up to this point, the method may include transaction T attempting to validate its read set, as in 940. If the validation fails, shown as the positive exit from 945, the method may include transaction T aborting, as in 980. If the validation is successful, shown as the negative exit from 945, the method may include transaction T changing its state to validated, as in 950, indicating to other transactions that its validation has succeeded. Thereafter, in this example, transaction T may re-peruse the dependence graph rooted at itself (e.g., in a manner similar to the perusal illustrated in FIG. 9A) to ensure that all the reachable transactions are either committed or validated. This is illustrated in FIG. 9B by the loop beginning at 955 and ending at 970, in which transactions on the dependency list are visited and (in 960) it is determined whether they are committed or validated (shown as the positive exit from 960) or aborted (shown as the negative exit from 960 and in 965). Once all of the transactions in the dependency list have been visited, shown as the negative exit from 970, the method may include committing the results of transaction T, and updating the state of transaction T to committed, as in 975. In other words, if transaction T finds that all reachable transactions are in a committed or validated state, transaction T has logically committed, and transaction T makes that explicit by switching its state to committed. In this example, since all transactions in the dependence graph follow the same commit protocol, all transactions visited from transaction T are also guaranteed to commit. Note that, as in the dependence graph perusal illustrated in FIG. 9B, if any of the visited transactions are in the protected state when visited at 955, the method may include waiting for the state of the visited transaction to change before continuing (not shown).

Note that while the example illustrated in FIGS. 9A-9B and described above implements a depth-first search of a dependence graph, in other embodiments, any complete and terminating approach may be used to traverse the dependence graph. Note also that in some cases, the dependence graph may contain dependency cycles. In some embodiments, the commit algorithm described above may end up in an infinite loop in the presence of such dependence cycles. In other embodiments, this problem may be avoided if a transaction T tracks the transactions it has visited and does not revisit the ones it already has visited. In such embodiments, transaction T may maintains a list of visited transactions (e.g., in its transaction descriptor) that it updates whenever it visits a new transaction.

As with ordinary transactions, if a transaction T that updates one or more transaction communicators aborts, it must roll back its updates to all the TxCommObjects it has modified. This rollback should be done in an orderly fashion so as to preserve the most recent logical value of each TxCommObject that transaction T modified. In the case of cascading aborts (e.g., in which an abort of a transaction recursively triggers aborts in transactions that directly or indirectly depend on the aborting transaction), multiple aborting transactions may attempt to rollback the same TxCommObject O at more or less the same time. In some embodiments, the system may be configured to preserve the rollback of the "oldest" aborting transaction in a dependence chain. To support this approach, during invocation of the set method of a TxCommObject O, a transaction T may log the last writer of O. During its post-abort rollback, transaction T may first acquire exclusive ownership of O, and then verify that the last writer that transaction T logged for O has not aborted. In this example, if the last writer that transaction T logged for O has not aborted, transaction T may roll back its update to O. If the last writer transaction has already aborted, transaction T may not need to perform a rollback of its update to O, since the last writer transaction will perform a rollback of the last value written to O.

Figure 10:
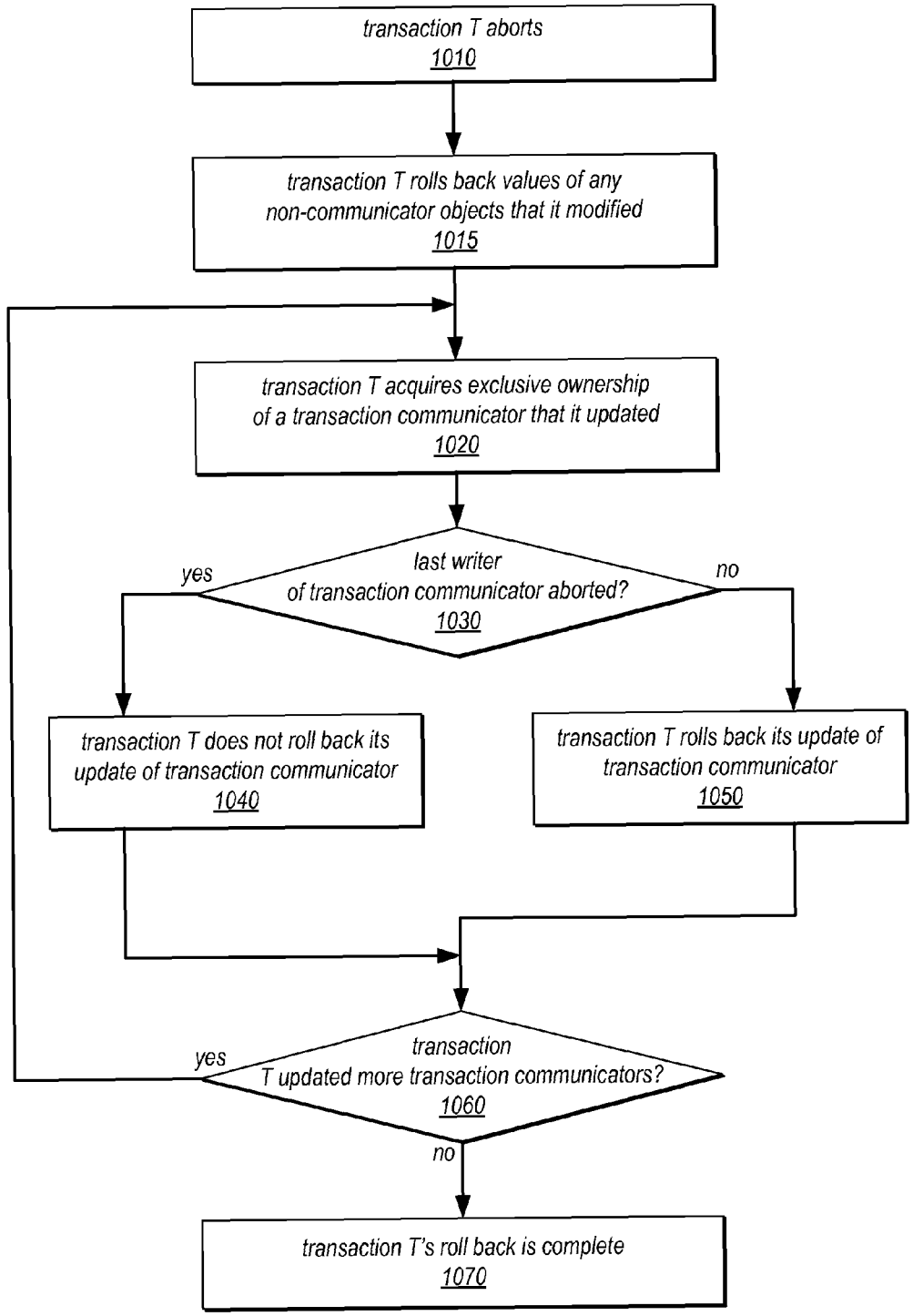
FIG. 10 is a flow diagram illustrating one embodiment of a method for performing a post-abort rollback of the results of a transaction that accesses a transaction communicator.

One embodiment of a method for performing a post-abort rollback of the results of a transaction that accesses a transaction communicator is illustrated by the flow diagram in FIG. 10. As illustrated in this example, the method may be performed in response to a transaction T aborting, as in 1010. As in a typical post-abort rollback operation, the method may include transaction T rolling back the values of the non-communicator objects that it has modified, if any, as in 1015. As described above, the method may also include transaction T rolling back the values of any communicator objects that it has modified. As illustrated in this example, the method may include transaction T acquiring exclusive ownership of a transaction communicator that it updated, as in 1020, e.g., using a compare-and-swap type operation.

If the last writer of the transaction communicator (e.g., as indicated in a last writer field of the transaction communicator) aborted, shown as the positive exit from 1030, transaction T may not roll back its update of the transaction communicator, as shown in 1040. However, if the last writer of the transaction communicator has not aborted, shown as the negative exit from 1030, the method may include transaction T rolling back its update of the transaction communicator, as in 1050. For example, transaction T may copy the values logged in its undo log back to the data fields of the transaction communicators that were modified by transaction T.

If transaction T updated any more transaction communicators, shown as the positive exit from 1060, the method may include repeating the operations illustrated in 1020-1060 for each of these other transaction communicators. Once any transaction communicator values that should be rolled back have been rolled back, shown as the negative exit from 1060, the post-abort rollback for transaction T may be complete, as shown in 1070.

The utility of transaction communicators (and communicator-isolating transactions) may be illustrated using the examples described below. In these examples, transaction communicators are used to implement two data structures that may be used for inter-transaction communication in an extension of the Java™ programming language that supports atomic blocks and communicators: an exchanger and a producer-consumer queue. Although the methods of these objects may be invoked from anywhere, the intention is that they be invoked from within ordinary transactions trying to cooperate to accomplish some task. Otherwise, there may be no need for transaction communicators, as ordinary transactions would suffice. Note that the producer-consumer queue described below may be used to implement the job-processing application described earlier.

In this example, to specify the implementations of these data structures, an extension may be added to the Java™ programming language, which includes support for atomic blocks. In this example, the extension may add two keywords: txcomm (which may be used to designate a field that ordinary transactions can use to communicate, i.e., a communicator field), and txcommatomic (which may be used to designate a block of code that should be executed in a communicator-isolating transaction). Note that in some embodiments, a txcomm modifier on a reference declaration may not imply that the referenced object is a communicator. If transactions want to communicate through that object, then the object must include one or more txcomm fields of its own.

An Exchanger class is a class of the Java™ concurrency library package whose instances serve as rendezvous points for threads to meet and exchange data objects. An exchange operation invoked within an ordinary transaction cannot complete successfully without violating isolation. However, in some embodiments, a communicator-based version of the Exchanger, described in detail herein, may be used to exchange values between transactions.

As illustrated in the example pseudo code below, in this example, the Exchanger may declare two txcomm buffers (buf1 and buf2). A transaction that invokes the exchange method may attempt to populate one of the two buffers and return the contents of the other. In this example, the exchange method may contain two txcommatomic blocks. The first block may be executed by all transactions to check and populate (write to) an available buffer (e.g., one that contains the value null). If neither buffer is available, the method may simply return null. The second txcommatomic block may be executed only by the transaction that populated buf1. This block may get (read) the second buffer's value and reset the values of both buffers. In each case, a txcommatomic block may be used to provide atomic access to the two buffers.

As shown in the example pseudo code below, enforcing the dependencies between the first block and the second block may be completely transparent to the programmer. In this example, transactions that conduct an exchange on an instance of this exchanger may become mutually dependent. Note that a transaction T that observes that it cannot participate in an exchange (e.g., because both buffers of the exchanger are already populated) may also depend on the transactions that last populated those buffers (i.e. the exchanging transactions). Therefore, if either of these two transactions aborts, then all three (including transaction T) must also abort. However, in this example, the exchanging transactions do not depend on transaction T since they have not seen any updates made by transaction T. Because of this asymmetric dependency, if transaction T aborts (e.g., because it could not participate in an exchange), the exchanging transactions do not also have to abort.

```
class Exchanger{
    txcomm Object buf1;
    txcomm Object buf2;
    public exchange (Object myBuf) {
        Object otherBuf = null;
        txcommatomic {
            if (buf1 == null) {
                // populate the first buffer slot
                buf1 = myBuf;
            } else {
                if (buf2 == null) {
                    // second buffer slot available
                    buf2 = myBuf;
                    // return the buffer in first slot
                    return buf1;
                } else {
                    // both slots occupied, return null
                    return null;
                }
            }
        }
        // spin-wait for the second buffer to be populated
        while (true) {
            txcommatomic {
                if (buf2 != null) {
                    // second buffer finally populated
                    otherBuf = buf2;
                    buf1 = null;
                    buf2 = null;
                    return otherBuf;
                }
            }
        }
    }
}
```

A producer-consumer queue is a widely used data structure that permits buffered communication between concurrent threads. For example, the producer-consumer queue described herein (which employs a communicator-based queue implementation) may be used to implement the job-processing application described above. In this example implementation, each job is executed in a single transaction that may enqueue a request object to access the database, and each database request is handled by a single transaction that consumes the request and communicates the result back to the requester through the request object, which is itself a communicator. In this example, a job requiring access to the database involves two mutually dependent transactions, and if either transaction aborts, the other must also abort, and both transactions must roll back any modifications made to communicator and non-communicator objects.

Figure 11:
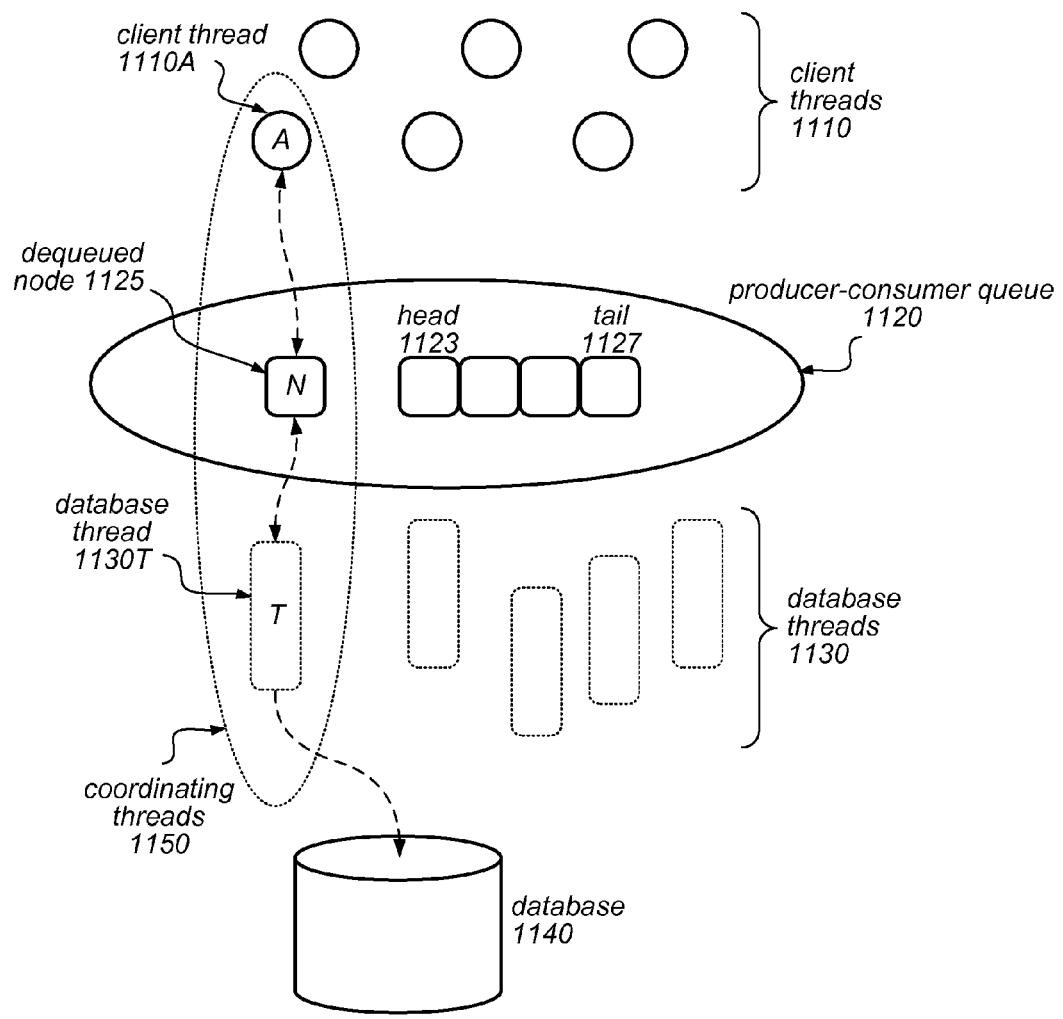
FIG. 11 is a block diagram illustrating components of a job processing application, as described herein.

The job processing application described above may be implemented as illustrated in FIG. 11. In this example, the data structure storing entries of a producer-consumer queue 1120 is a simple linked list with a head pointer 1123 and a tail pointer 1127. In this example, client threads 1110 and database threads 1130 may concurrently access the producer-consumer queue. A producer may enqueue a new item by adding a node to the tail, and a consumer may dequeue an item by taking it from the node pointed to by the head. As illustrated in FIG. 11, a client thread 1110A may place a request to access database 1140 into producer-consumer queue 1120 (i.e. client thread 1110A may enqueue a request). A database thread 1130T may dequeue the entry (shown as dequeued node 1125) and may access database 1140 on behalf of client thread 1110A. In other words, client thread 1110A and database thread 1130T may represent threads or processes that have a dependency relationship. Therefore, they are designated in FIG. 11 as coordinating threads 1150.

A particularly interesting part of the producer-consumer interaction may appear in the boundary cases, such as when the queue is empty, or when the queue is full (in case of bounded queues). In some embodiments, if a consumer requests an item from the queue, but the queue is empty, the system may force the consumer to wait for a producer to enqueue an item in the queue so that it can return the newly added item to the requester. Similarly, when a producer attempts to enqueue a new item in a full queue, the producer may be forced to wait for a consumer to dequeue an existing item from the queue before it can enqueue the new item. In both cases, coordination between the producer and the consumer may avoid unnecessary unbounded waiting for both.

In previous approaches, e.g., using a language like the Java™ programming language, such explicit inter-thread coordination between transactional producers and consumers was achieved with wait-notify style condition synchronization, or using a retry construct. However, a retry-based solution may not scale well. This is because the transactional producer-consumer data structure may significantly limit concurrency, since transactions must modify either the head or the tail of the queue. Dependence-aware transactional memories (which have been proposed) may mitigate the scalability problem, but even this approach may not be helpful when the producer is slower than the consumers, and the queue is usually empty. Consumers waiting for the queue to be populated may create circular dependencies between producers and consumers, which are not permitted in the proposed dependence-aware transactional memories. However, the communicator-based version of the producer-consumer queue described herein may avoid these scalability problems.

The example pseudo code below illustrates an unbounded producer-consumer queue implemented using transaction communicators, according to one embodiment. In this example, the head and tail fields of the queue, as well as the next field of the node class are declared as transaction communicators using the txcomm modifier. In this example, the producer uses a single txcommatomic block to enqueue a node in the queue. The consumer spin-waits on an empty queue, and uses a txcommatomic block to dequeue a node from the queue if the queue is not empty.

Note that when designing a transaction communicator, the programmer should avoid extraneous dependencies between transactions that access that communicator's txcomm fields, if possible. In this example, each txcommatomic block is designed to avoid establishing unnecessary dependencies between transactions. For example, the producer checks the value of the tail field to determine if the queue is empty, whereas the consumer checks the value of the head field to do so. If the producer had checked the head field to see if the queue is empty, this check would have created a dependency on the last consumer (which modified the head field).

```
Class ProducerConsumerQueue{
    txcomm Node head;
    txcomm Node tail;
    public ProducerConsumerQueue ( ){
        head = tail = null;
    }
    public void produce (Object data) {
        Node myNode = new Node (data);
        txcommatomic {
            if (tail == null) {
                head = tail = myNode;
            } else {
                tail.next = myNode;
                tail = myNode;
            }
        }
    }
    public Object consume ( ) {
        Node node;
        while (true) {
            txcommatomic {
                if (head != null) {
                    // queue is not empty, do the dequeue
                    node = head;
                    if (head.next == null) {
                        // dequeuing last node
                        head = tail = null
                    } else {
                        head = head.next;
                    }
                    return node.data;
                }
            }
        }
    }
}
class Node {
    Object data;
    txcomm Node next;
    public Node ( Object data) {
        this.data=data;
    }
}
```

As previously noted, because changes to transaction communicators by ordinary transactions may be immediately visible to other transactions, access to these communicators may need to be synchronized in order to avoid data races. Ordinary transactions cannot be used to do this synchronization. Therefore, in some embodiments, the system may support communicator-isolating transactions, which provide isolation for all accesses to shared objects, including transaction communicators and non-communicator objects. Communicator-isolating transactions are described in more detail below.

In some embodiments, the communicator-isolating transaction may be supported in the form of a special nested transaction. In one embodiment, the API for this nested transaction may include a special TxCommBegin method to begin the communicator-isolating transaction, and a TxCommCommit method to commit the communicator-isolating transaction. Other embodiments may provide different APIs for communicator-isolating transactions. In some embodiments, ownership of TxCommObjects accessed inside this special nested transaction may persist until the communicator-isolating transaction commits. This strategy may in some embodiments be sufficient to guarantee isolation of TxCommObject accesses within the scope of a communicator-isolating nested transaction.

The semantics of communicator-isolating transactions may be essentially the same as for ordinary transactions that do not isolate communicators. For example, committed transactions should appear to execute serially in the transaction order, which must totally order all such transactions. Therefore, if two active transactions conflict then (at least) one of them must abort or wait for the other to complete (e.g., either commit or abort). In some embodiments, non-communicator shared objects may be accessed within a communicator-isolating transaction, and may be guaranteed isolation just as in an ordinary transaction. These features of communicator-isolating transactions may make them an appealing synchronization alternative in this situation.

In some embodiments, the system may provide flat nesting semantics for communicator-isolating transactions. In such embodiments, a communicator-isolating transaction nested within another communicator-isolating transaction may be equivalent to having just the outer transaction. An ordinary (non-communicator-isolating) transaction nested within a communicator-isolating transaction may also be equivalent to having just the outer (communicator-isolating) transaction, because the outer transaction may isolate accesses to non-communicators as well as communicators. However, a communicator-isolating transaction nested within an ordinary transaction cannot simply be flattened. Instead, the code executed within the nested communicator-isolating transaction may provide isolation for communicator accesses within the nested transaction, but changes to communicators made outside the nested transaction may be seen before the outer transaction commits. Thus, although ordinary transactions that communicate (i.e. that access common communicators) may have their operations interleave, there can be no interleaving between the ordinary transaction and the operations of a communicator-isolating transaction. In some embodiments, modifications made to a transaction communicator by an ordinary transaction outside the scope of a communicator-isolating transaction nested therein may be visible to other transactions and to the nested communicator-isolating transaction, while modifications made to non-communicator objects by an ordinary transaction outside the scope of a communicator-isolating transaction nested therein may not be visible to other transactions, but may be visible to the nested communicator-isolating transaction. In other embodiments, all accesses to transaction communicators may be required to be performed within communicator-isolating transactions. In such embodiments, the communicator-isolating transactions may or may not be nested within an ordinary transaction, e.g., depending on whether the transaction also includes accesses to non-communicator objects that could be performed outside of a communicator-isolating transaction.

Figure 12:
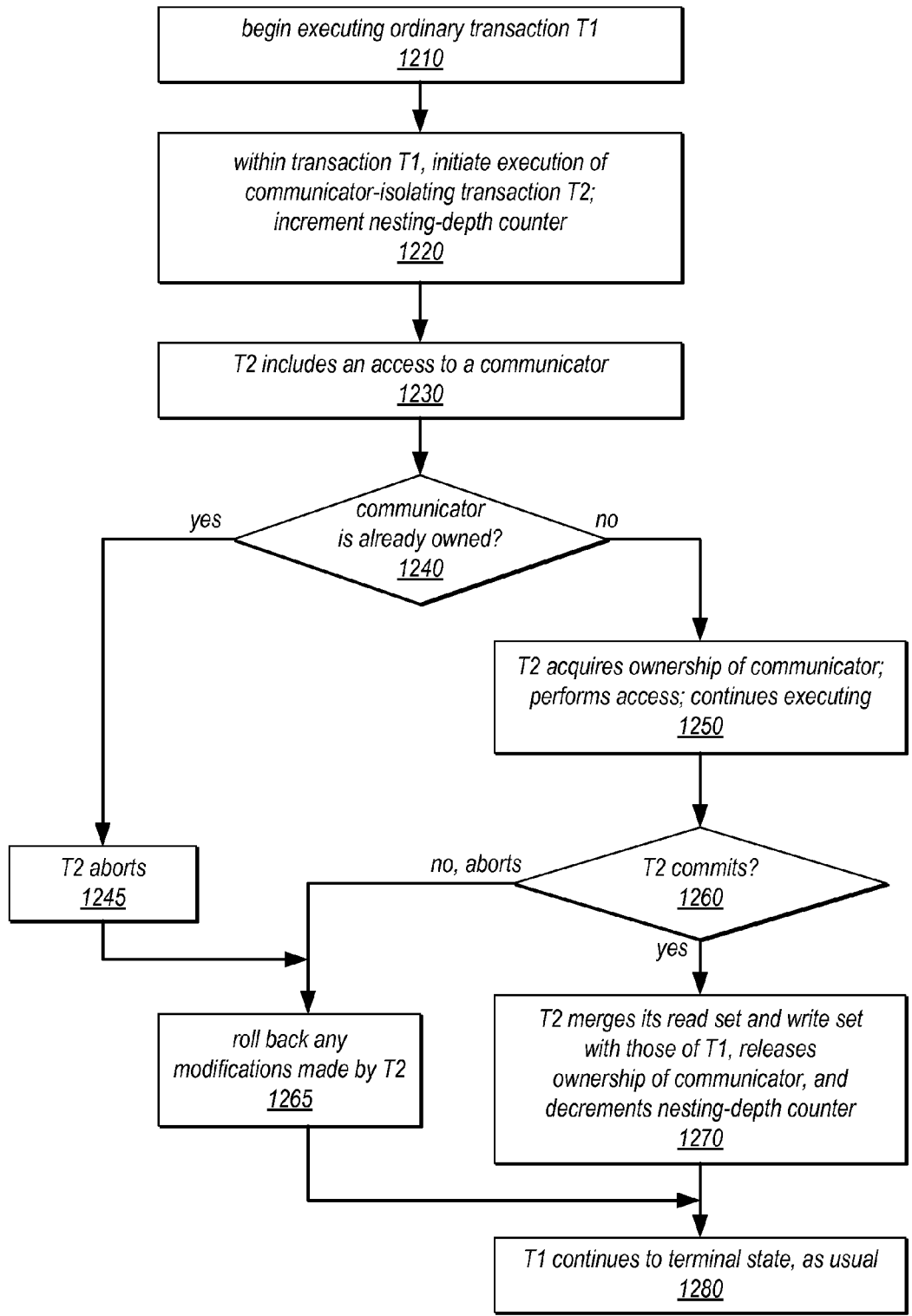
FIG. 12 is a flow diagram illustrating one embodiment of a method for utilizing a communicator-isolating transaction, as described herein.

One embodiment of a method for utilizing a communicator-isolating transaction, as described herein, is illustrated by the flow diagram in FIG. 12. As illustrated at 1210 in this example, the method may include beginning execution of an ordinary transaction T1 (i.e. a transaction that is not a communicator-isolating transaction). Within transaction T1, execution of a communicator-isolating transaction (T2) may be initiated, as in 1220. As described above, when a communicator-isolating transaction is initiated within another transaction, a counter may be incremented to reflect the nesting-depth of the communicator-isolating transactions within the outermost transaction (T1).

As illustrated in this example, if transaction T2 includes an access to a communicator, as in 1230, the method may include determining whether the communicator is already owned, as in 1240. If the communicator is already owned by a transaction (other than its parent transaction, T1, or another ancestor transaction), shown as the positive exit from 1240, the method may include transaction T2 aborting, as in 1245. If the communicator is not already owned, shown as the negative exit from 1240, the method may include transaction T2 acquiring ownership of the communicator, performing the access to the communicator, and continuing its execution, as in 1250. If transaction T2 later commits, shown as the positive exit from 1260, the method may include T2 merging its read set and write set with those of transaction T1, as in 1270. In other words, because communicator-isolating transaction T2 is not flattened into ordinary transaction T1, transaction T2 may maintain its own read and write sets, which must be merged with those of the parent transaction T1 if transaction T2 commits. On the other hand, when nested transactions are flattened (e.g., when one communicator-isolating transaction is nested within another communicator-isolating transaction or when an ordinary transaction is nested within a communicator-isolating transaction), a single read set and a single write set may be maintained for the overall flattened transaction. In those cases, when the nested transaction commits, the method may only need to decrement the nesting-depth counter and continue executing the outer (parent) transaction.

As illustrated in this example, if transaction T2 commits, the method may also include transaction T2 releasing ownership of the communicator and decrementing the counter to reflect a decrease in the nesting depth of transaction T1. Transaction T1 may then continue executing until it reaches a terminal state, as in 1280. For example, T1 may continue executing until transaction T1 aborts or commits its results, along with those of transaction T2, if transaction T2 also commits. If transaction T2 aborts, rather than commits, shown as the negative exit from 1260 or the path from 1245, the method may include rolling back any modifications made by transaction T2, as in 1265, and then T1 continuing its execution, as in 1280. In other words, communicator-isolating transaction T2 is not flattened into ordinary transaction T1, and its effects should not be seen by any other transactions (including its parent transaction, T1) if it aborts. Note that while the example illustrated in FIG. 12 includes just one level of nesting, the illustrated techniques may in various embodiments be applicable to an arbitrary nesting depth.

As described herein, in some embodiments transaction communicators may enable programmers to allow concurrent transactions to communicate in a controlled fashion. In addition, communicator-isolating transactions may be provided to help synchronize accesses to communicators. Although communicators may compromise the isolation that makes transactional programming attractive, the impact of this loss of isolation may be limited by ensuring that transactions do not commit unless all the transactions on which they depend also commit. The resulting flexibility may in some embodiments be worth the additional cost in complexity. A runtime system that supports transaction communicators may track read-after-write dependency relationships as well as write-after-write ordering dependency relationships between communicating transactions. The embodiments described herein may inter-operate with a wide variety of Software Transactional Memory (STM) runtimes, ranging from early indirection based STMs to the most recent state-of-the-art managed language and unmanaged language STMs. In some embodiments, the system may operate in an object-oriented environment, such as an environment based on the Java™ programming language.

Figure 13:
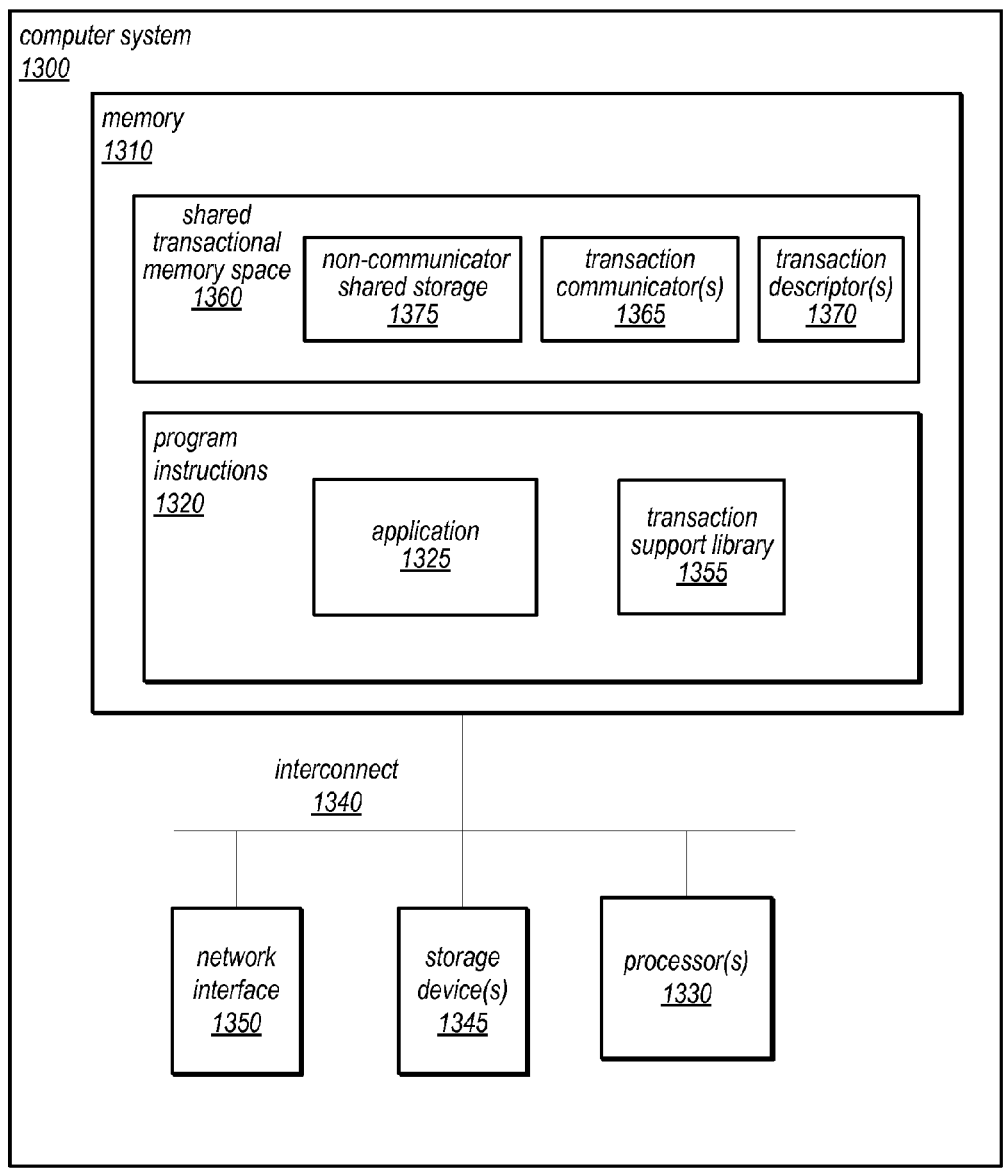
FIG. 13 is a block diagram of a computer system configured to execute transactions that access transaction communicator objects, according to some embodiments.

The techniques described herein for executing transactions that access transaction communicator objects may be implemented in any of a wide variety of computing systems. FIG. 13 illustrates a computing system configured to execute transactions that access transaction communicator objects, as described herein and according to various embodiments. Computer system 1300 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. In various embodiments, computer system 1300 may comprise transactional memory mechanisms for implementing transactional memory in hardware. In various embodiments, transactional memory may be implemented in hardware, in software, or using a combination thereof. Transactional memory implementations may provide a "begin transaction", or similar instruction, and a "commit", or similar instruction, to explicitly indicate the beginning and end of a given transaction respectively, as described herein.

The described methods may in some embodiments be provided as a computer program product, or software, that may include a non-transitory, computer-readable storage medium having stored thereon instructions, which may be used to program computer system 1300 (and/or other electronic devices) to execute transactions that access transaction communicator objects, as described herein. A non-transitory, computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In other embodiments, program instructions executable to perform the methods described herein may be communicated using optical, acoustical or other form of propagated signal (e.g., carrier waves, infrared signals, digital signals, etc.).

A computer system 1300 may include one or more processors 1330 (each of which may be a single-threaded processor, a multi-threaded processor, a multi-core processor, etc.). Each processor may comprise more than one logical processor, for example, in systems supporting simultaneous multi-threading (SMT). In computer system 1300, each processor 1330 may comprise one or more hardware cache coherence mechanisms. However, in various embodiments, cache coherence mechanisms may also be implemented in software, or in both hardware and software simultaneously. These mechanisms and protocols may insure coherence between caches, for example, according to MESI or MOESI protocols.

The computer system 1300 may also include one or more system memories 1310 (e.g., one or more of cache, SRAM, DRAM, RDRAM, EDO RAM, DDR RAM, SDRAM, Rambus RAM, EEPROM, etc.), a system interconnect 1340 (e.g., LDT, PCI, ISA, etc.), a network interface 1350 (e.g., an ATM interface, an Ethernet interface, a Frame Relay interface, etc.), and one or more persistent storage device(s) 1345 (e.g., optical storage, magnetic storage, hard drive, tape drive, solid state memory, etc.). The memory medium may include other types of memory as well, or combinations thereof. In other embodiments, computer system 1300 may include fewer or additional components not illustrated in FIG. 13 (e.g., video cards, audio cards, additional network interfaces, peripheral devices, a network interface such as an ATM interface, an Ethernet interface, a Frame Relay interface, or other devices). The processor (s) 1330, the storage device(s) 1345, the network interface 1350, and the system memory 1310 may be coupled to system interconnect 1340 and may communicate with each other through system interconnect 1340. In general, interconnect 1340 may be implemented as any broadcast, point-to-point, or hybrid communication mechanism such as a front side bus, Ethernet, InfiniBand™, etc.

In some embodiments, system memory 1310 may include program instructions 1320 and/or transaction support library 1355. Program instructions 1320 may include a compiled application 1325, which may include executable program code specifying one or more atomic transactions that perform accesses to one or more transaction communicator objects, and which may include calls to functions of transaction support library 1355, which may be configured to provide various methods for implementing atomic transactions, as described herein. In some embodiments, class definitions for transaction communicator objects may be included in transaction support library 1355.

Application 1325 and transaction support library 1355 may each be implemented in any of various programming languages or methods. For example, application 1325 and transaction support library 1355 may be encoded in platform native binary, any interpreted language such as Java™ bytecode, or in any other language such as C/C++, the Java™ programming language, etc., or any combination thereof, in different embodiments. Moreover, in some embodiments, transaction support library 1355, and application 1325 may not be implemented using the same programming language. For example, application 1325 may be C++ based, while transaction support library 1355 may be developed using C.

As illustrated in FIG. 13, memory 1310 may also include a shared transactional memory space 1360, which may support and/or be accessed by transactions in a software transactional memory implementation, a hardware transactional memory implementation, and/or a hardware-software hybrid transactional memory implementation, in different embodiments. In some embodiments, shared transactional memory space 1360 may comprise memory locations for storing shared variables and other data structures, including some of all of those described herein. For example, memory 1310 and/or shared transactional memory space 1360 may include one or more storage locations configured to store one or more transaction communicators 1365, one or more transaction descriptors 1370, and/or one or more non-communicator shared objects 1375. In other embodiments, these and/or other shared variables and data structures may be stored in user memory on one or more of persistent storage device(s) 1345.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method, comprising:
performing, by a computer:
executing a plurality of mutually dependent transactions, wherein the executing implies a sequence order for the transactions dependent on an order of accesses to one or more communicator objects, and wherein a communicator object is a shared object of a designated communicator object type that defines the object as an object that is accessible by concurrent transactions and through which concurrent transactions can communicate;
wherein the executing comprises:
each of the plurality of transactions other than the first transaction in the sequence order:
accessing a communicator object that was accessed by a previous transaction in the sequence order; and
updating a dependency tracking data structure to indicate its dependence on the previous transaction in the sequence order;
wherein, for at least one of the plurality of transactions other than the first transaction in the sequence order, said updating the dependency tracking data structure to indicate its dependence on the previous transaction comprises adding an indication that the previous transaction was the last writer of the communicator object to the dependency tracking data structure; and
the first transaction in the sequence order:
accessing a communicator object that was accessed by the last transaction in the sequence order;
updating a dependency tracking data structure to indicate its dependence on the last transaction in the sequence order; and
attempting to commit its results, wherein success of said attempting is dependent, at least in part, on whether the last transaction in the sequence order can also commit its results.

2. The method of claim 1, wherein the plurality of transactions comprises two mutually dependent transactions, and wherein said executing comprises the two mutually dependent transactions accessing a single communicator object.

3. The method of claim 1, wherein the plurality of transactions comprises two mutually dependent transactions, and wherein said executing comprises both of the two mutually dependent transactions accessing two or more communicator objects in common.

4. The method of claim 1, wherein the plurality of transactions comprises three or more mutually dependent transactions, and wherein success of said attempting is dependent on whether all of the other transactions in the plurality of mutually dependent transactions can also commit their results.

5. The method of claim 1, wherein said accessing a communicator object that was accessed by a previous transaction in the sequence order comprises reading a data object portion of a communicator object whose value was modified by the previous transaction.

6. The method of claim 1, wherein said accessing a communicator object that was accessed by a previous transaction in the sequence order comprises writing to a data object portion of a communicator object whose value was modified by the previous transaction.

7. The method of claim 1, wherein said updating a dependency tracking data structure comprises updating a common dependency tracking data structure in which dependencies between the plurality of mutually dependent transactions are recorded.

8. The method of claim 1, wherein said updating a dependency tracking data structure comprises updating a dependency tracking data structure associated with the transaction and in which indications of other transactions on which the transaction is dependent are recorded.

9. The method of claim 1,
wherein, for at least another one of the plurality of transactions other than the first transaction in the sequence order, said updating the dependency tracking data structure to indicate its dependence on the previous transaction comprises adding a reader list associated with a communicator object that was accessed by the transaction to the dependency tracking data structure.

10. The method of claim 1, wherein said accessing a communicator object comprises obtaining exclusive ownership of the communicator object prior to reading or modifying a data object portion of the communicator object.

11. The method of claim 1, wherein said attempting to commit comprises determining whether the last transaction in the sequence order is aborted.

12. The method of claim 1, further comprising:
in response to a failure of said attempting to commit, rolling back values of any non-communicator objects that were modified by the first transaction.

13. The method of claim 1, further comprising:
in response to a failure of said attempting to commit, rolling back values of any communicator objects that were modified by the first transaction.

14. The method of claim 1, further comprising:
executing a communicator-isolating transaction that is nested within one of the plurality of mutually dependent transactions, wherein a communicator-isolating transaction is a transaction that ensures isolation of communicator accesses by the communicator-isolating transaction.

15. A system comprising:
one or more processors; and
memory coupled to the one or more processors and storing program instructions that when executed by the one or more processors cause the one or more processors to perform:
executing a plurality of mutually dependent transactions, wherein the executing implies a sequence order for the transactions dependent on an order of accesses to one or more communicator objects, and wherein a communicator object is a shared object of a designated communicator object type that defines the object as an object that is accessible by concurrent transactions and through which concurrent transactions can communicate;
wherein the executing comprises:
each of the plurality of transactions other than the first transaction in the sequence order:
accessing a communicator object that was accessed by a previous transaction in the sequence order; and
updating a dependency tracking data structure to indicate its dependence on the previous transaction in the sequence order;
wherein, for at least one of the plurality of transactions other than the first transaction in the sequence order, said updating the dependency tracking data structure to indicate its dependence on the previous transaction comprises adding an indication that the previous transaction was the last writer of the communicator object to the dependency tracking data structure; and
the first transaction in the sequence order:
accessing a communicator object that was accessed by the last transaction in the sequence order;
updating a dependency tracking data structure to indicate its dependence on the last transaction in the sequence order; and
attempting to commit its results, wherein success of said attempting is dependent, at least in part, on whether the last transaction in the sequence order can also commit its results.

16. The system of claim 15,
wherein said accessing a communicator object that was accessed by a previous transaction in the sequence order comprises reading a data object portion of a communicator object whose value was modified by the previous transaction or writing to a data object portion of a communicator object whose value was modified by the previous transaction.

17. The system of claim 15,
wherein said attempting to commit comprises determining whether the last transaction in the sequence order is aborted; and
wherein when executed by the one or more processors, the program instructions further cause the one or more processors to perform, in response to a failure of said attempting to commit:
rolling back values of any non-communicator objects that were modified by the first transaction; and
rolling back values of any communicator objects that were modified by the first transaction.

18. A non-transitory, computer-readable storage medium storing program instructions that when executed by one or more computers cause the one or more computers to perform:
executing a plurality of mutually dependent transactions, wherein the executing implies a sequence order for the transactions dependent on an order of accesses to one or more communicator objects, and wherein a communicator object is a shared object of a designated communicator object type that defines the object as an object that is accessible by concurrent transactions and through which concurrent transactions can communicate;
wherein the executing comprises:
each of the plurality of transactions other than the first transaction in the sequence order:
accessing a communicator object that was accessed by a previous transaction in the sequence order; and
updating a dependency tracking data structure to indicate its dependence on the previous transaction in the sequence order;
wherein, for at least one of the plurality of transactions other than the first transaction in the sequence order, said updating the dependency tracking data structure to indicate its dependence on the previous transaction comprises adding an indication that the previous transaction was the last writer of the communicator object to the dependency tracking data structure; and
the first transaction in the sequence order:
accessing a communicator object that was accessed by the last transaction in the sequence order;
updating a dependency tracking data structure to indicate its dependence on the last transaction in the sequence order; and
attempting to commit its results, wherein success of said attempting is dependent, at least in part, on whether the last transaction in the sequence order can also commit its results.

19. The storage medium of claim 18,
wherein said accessing a communicator object that was accessed by a previous transaction in the sequence order comprises reading a data object portion of a communicator object whose value was modified by the previous transaction or writing to a data object portion of a communicator object whose value was modified by the previous transaction.

20. The storage medium of claim 18,
wherein the last transaction is nested within the first transaction; and
wherein the last transaction comprises a communicator-isolating transaction that ensures isolation of communicator accesses by the last transaction.

* * * * *